(12) United States Patent
Kitamura et al.

(10) Patent No.: US 11,431,238 B2
(45) Date of Patent: Aug. 30, 2022

(54) POWER CONVERSION DEVICE, MOTOR DRIVE UNIT, AND ELECTRIC POWER STEERING DEVICE

(71) Applicant: NIDEC CORPORATION, Kyoto (JP)

(72) Inventors: Takashi Kitamura, Kyoto (JP); Eiji Wada, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/121,064

(22) Filed: Sep. 4, 2018

(65) Prior Publication Data

US 2018/0375457 A1    Dec. 27, 2018

Related U.S. Application Data

(63) Continuation of application No. PCT/JP2017/008191, filed on Mar. 1, 2017.

(30) Foreign Application Priority Data

Mar. 4, 2016    (JP) .............................. JP2016-042741

(51) Int. Cl.
*H02M 1/32*      (2007.01)
*H02H 3/16*      (2006.01)
(Continued)

(52) U.S. Cl.
CPC ............ *H02M 1/32* (2013.01); *B62D 5/0457* (2013.01); *B62D 5/0463* (2013.01);
(Continued)

(58) Field of Classification Search
CPC combination set(s) only.
See application file for complete search history.

(56) References Cited

U.S. PATENT DOCUMENTS

| 4,466,110 A | 8/1984 | Kizaki et al. |
| 6,072,856 A * | 6/2000 | Van Der Broeck ... H02M 3/337 363/132 |

(Continued)

FOREIGN PATENT DOCUMENTS

| CN | 1064773 A | 9/1992 |
| CN | 101772987 A | 7/2010 |

(Continued)

OTHER PUBLICATIONS

International Search Report corresponding to Application No. PCT/JP2017/008191; dated May 16, 2017.

(Continued)

*Primary Examiner* — Muhammad S Islam
*Assistant Examiner* — Charles S Laughlin
(74) *Attorney, Agent, or Firm* — Cantor Colburn LLP

(57) ABSTRACT

A power conversion device may include a first inverter to which one end of each phase winding of a motor is coupled, a second inverter to which the other end of each phase winding is coupled, and a switch circuit having at least one of a first switch element that switches between connection and disconnection of the first inverter to and from a ground, a first protection circuit being coupled in parallel to the first switch element, and a second switch element that switches between connection and disconnection of the second inverter to and from the ground, a second protection circuit being coupled in parallel to the second switch element.

16 Claims, 23 Drawing Sheets

(51) Int. Cl.

| | |
|---|---|
| *H02P 9/02* | (2006.01) |
| *H02P 27/06* | (2006.01) |
| *H02M 7/48* | (2007.01) |
| *H02P 25/18* | (2006.01) |
| *B62D 5/04* | (2006.01) |
| *H02H 7/08* | (2006.01) |
| *H02M 7/5387* | (2007.01) |
| *H02P 27/08* | (2006.01) |
| *H02P 29/024* | (2016.01) |
| *H02M 1/00* | (2006.01) |
| *B60R 16/03* | (2006.01) |

(52) U.S. Cl.
CPC ......... *B62D 5/0481* (2013.01); *H02H 7/0833* (2013.01); *H02M 7/48* (2013.01); *H02M 7/53871* (2013.01); *H02P 25/18* (2013.01); *H02P 27/06* (2013.01); *H02P 27/08* (2013.01); *H02P 29/0241* (2016.02); *B60R 16/03* (2013.01); *H02M 1/0009* (2021.05); *H02M 1/325* (2021.05); *H02P 2209/01* (2013.01)

(56) References Cited

U.S. PATENT DOCUMENTS

| | | | |
|---|---|---|---|
| 7,969,104 B2 | 6/2011 | Taniguchi | |
| 9,124,207 B2* | 9/2015 | Hayashi | ............... H02P 6/20 |
| 2004/0062064 A1 | 4/2004 | Pelly | |
| 2006/0108957 A1 | 5/2006 | Urakabe et al. | |
| 2010/0141189 A1* | 6/2010 | Matt | ............ H02P 27/06 |
| | | | 318/400.26 |
| 2011/0225929 A1* | 9/2011 | Donati | ............ B65B 51/227 |
| | | | 53/377.7 |
| 2011/0290580 A1* | 12/2011 | Mukai | ............ B62D 5/0481 |
| | | | 180/443 |
| 2013/0094266 A1* | 4/2013 | Balpe | ............... H02M 7/537 |
| | | | 363/131 |
| 2014/0132197 A1* | 5/2014 | Kanazawa | ............ H02K 11/33 |
| | | | 318/724 |
| 2016/0134212 A1 | 5/2016 | Kikuchi et al. | |

FOREIGN PATENT DOCUMENTS

| | | |
|---|---|---|
| CN | 202957746 U | 5/2013 |
| EP | 2706650 A2 | 3/2014 |
| JP | S5797751 A | 6/1982 |
| JP | 2006149153 A | 6/2006 |
| JP | 2014068428 A | 4/2014 |
| JP | 5569626 B1 | 8/2014 |
| JP | 2014192950 A | 10/2014 |
| JP | 2015033269 A | 2/2015 |
| JP | 5797751 B2 | 10/2015 |
| JP | 2016019385 A | 2/2016 |

OTHER PUBLICATIONS

Babiel Gerhard, "Vehicle electrical systems and power management" Wiesbaden : Springer Fachmedien, 2013. pp. 101-120. Semiconductors for Onboard Power Supply Applications; ISBN 978 3-658-01559-6 (see DEOA for relevance.).

German Office Action for corresponding DE Application No. 112017000686.4; dated, May 25, 2022.

* cited by examiner ated motor in which a motor, a power conversion device, and an ECU are integrated together has in recent years been developed. In particular, in the field of vehicle-mounted devices, high quality needs to be ensured for safety. Therefore, a fault-tolerant design is employed in order to allow the motor system to continue a safe operation even if some part of the motor system fails. As an example of such a fault-tolerant design, a single motor may be provided with two power conversion devices. As another example, the ECU may be provided with a backup microcontroller in addition to a main microcontroller.

POWER CONVERSION DEVICE, MOTOR DRIVE UNIT, AND ELECTRIC POWER STEERING DEVICE

CROSS REFERENCE TO RELATED APPLICATIONS

This is a continuation of International Application No. PCT/JP2017/008191, with an international filing date of Mar. 1, 2017, which claims priority of Japanese Patent Application No. 2016-042741, filed on Mar. 4, 2016, the entire contents of both which are hereby incorporated by reference.

TECHNICAL FIELD

The present disclosure relates to power conversion devices for converting power from a power supply into power that is to be supplied to an electric motor, motor drive units, and electric power steering devices.

BACKGROUND

Electric motors (hereinafter simply referred to as "motors") such as brushless DC motors and AC synchronous motors are typically driven by three phase currents. A complicated control technique, such as vector control, is needed to accurately control the waveforms of the three phase currents. Such a control technique requires complicated mathematical calculation and is therefore performed using a digital computation circuit, such as a microcontroller (microcomputer). The vector control technique is utilized in the fields of applications in which the load on a motor varies significantly, such as washing machines, motorized bicycles, electric scooters, electric power steering devices, electric cars, and industrial equipment. Meanwhile, other motor control techniques, such as pulse width modulation (PWM), are employed for motors that have a relatively low output.

In the field of vehicle-mounted devices, an automotive electronic control unit (ECU) is used in a vehicle. The ECU includes a microcontroller, a power supply, an input/output circuit, an A/D converter, a load drive circuit, and a read only memory (ROM), etc. An electronic control system is constructed using the ECU as a main component. For example, the ECU processes a signal from a sensor to control an actuator, such as a motor. More specifically, the ECU controls an inverter in a power conversion device while monitoring the rotational speed or torque of a motor. The power conversion device converts drive power that is to be supplied to the motor, under the control of the ECU.

A mechanically and electronically integrated motor in which a motor, a power conversion device, and an ECU are integrated together has in recent years been developed. In particular, in the field of vehicle-mounted devices, high quality needs to be ensured for safety. Therefore, a fault-tolerant design is employed in order to allow the motor system to continue a safe operation even if some part of the motor system fails. As an example of such a fault-tolerant design, a single motor may be provided with two power conversion devices. As another example, the ECU may be provided with a backup microcontroller in addition to a main microcontroller.

For example, Japanese Laid-Open Patent Publication No. 2014-192950 describes a power conversion device for converting power that is to be supplied to a three-phase motor, the device including a control unit and two inverters. The two inverters are each coupled to a power supply and a ground (hereinafter referred to as a "GND"). One of the two inverters is coupled to one end of each of the three phase windings of the motor, and the other inverter is coupled to the other end of each of the three phase windings. Each inverter includes a bridge circuit that includes three legs each including a high-side switching element and a low-side switching element. The control unit, when detecting a failure in a switching element in the two inverters, switches the control of the motor from control under normal conditions to control under abnormal conditions. As used herein, the term "abnormal conditions" mainly means that a switching element has failed. The term "control under normal conditions" means control that is performed when all the switching elements are operating normally. The term "control under abnormal conditions" means control that is performed in the event of a failure in a switching element.

The control under normal conditions has a control mode in which one of the two inverters is used to drive a motor with a neutral point being formed in the other inverter, and another control mode in which a motor is driven by turning on and off the switching elements of the two inverters. The power conversion device of Japanese Laid-Open Patent Publication No. 2014-192950 can switch between these modes according to the rotational speed and output torque, etc., of a motor.

In the control under abnormal conditions, a neutral point for the windings is formed by turning on and off switching elements according to a predetermined rule in one of the two inverters that includes a switching element that has failed (hereinafter referred to as a "failed inverter"). According to the rule, for example, in the event of an open-circuit failure in which a high-side switching element is always off, the three high-side switching elements other than the failed switching element are turned off, and the three low-side switching elements are turned on, in the bridge circuit of the failed inverter. In this case, the neutral point is formed on the low side. In the event of a short-circuit failure in which a high-side switching element is always on, the three high-side switching elements other than the failed switching element are turned on, and the three low-side switching elements are turned off, in the bridge circuit of the failed inverter. In this case, the neutral point is formed on the high side. In the power conversion device of Japanese Laid-Open Patent Publication No. 2014-192950, the neutral point for the three phase windings is formed in a failed inverter under abnormal conditions. Even in the event of a failure in a switching element, the motor can continue to be driven using one of the inverters that is operating normally.

SUMMARY

In the above conventional technique, there has been demand for further improvement in current control.

An embodiment of the present disclosure provides a power conversion device that can perform suitable current control.

An example power conversion device according to the present disclosure for converting power from a power supply into power that is to be supplied to a motor having n phase windings (n is an integer of three or more), includes a first inverter to which one end of each phase winding of the motor is coupled, a second inverter to which the other end of each phase winding is coupled, and a switch circuit having at least one of a first switch element that switches between connection and disconnection of the first inverter to and from a ground, a first protection circuit being coupled in parallel to the first switch element, and a second switch element that switches between connection and disconnection of the second inverter to and from the ground, a second protection circuit being coupled in parallel to the second switch element.

According to the illustrative embodiment of the present disclosure, the inverters can be connected and disconnected to and from at least one of the power supply and the GND by the switch elements coupled in parallel to the respective protection circuits. As a result, provided are a power conversion device that can perform suitable current control, a motor drive unit having the power conversion device, and an electric power steering device having the motor drive unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Before describing embodiments of the present disclosure, the present inventor's findings that are the basis of the present disclosure will be described.

In the power conversion device of Japanese Laid-Open Patent Publication No. 2014-192950, the two inverters are each always connected to the power supply and the GND. This configuration does not allow the power supply and the failed inverter to be disconnected from each other. The present inventors have found the problem that even when a neutral point is formed in a failed inverter under abnormal conditions, a current flows from the power supply into the failed inverter. As a result, a power loss occurs in the failed inverter.

As with the power supply, a failed inverter cannot be disconnected from the GND. The present inventors have found the problem that even when a neutral point is formed in a failed inverter under abnormal conditions, a current supplied to each phase winding through an inverter that is operating normally is not returned to that source inverter, and flows to the GND through the failed inverter. In other words, a closed loop of a drive current cannot be formed. It is desirable that a current supplied to each phase winding through an inverter that is operating normally should flow to the GND through that source inverter.

Embodiments of a power conversion device, motor drive unit, and electric power steering device according to the present disclosure will now be described in detail with reference to the accompanying drawings. To avoid unnecessarily obscuring the present disclosure, well-known features may not be described or substantially the same elements may not be redundantly described, for example. This is also for ease of understanding the present disclosure.

Embodiments of the present disclosure are herein described using, as an example, a power conversion device that converts power that is to be supplied to a three-phase motor having three phase (U-phase, V-phase, and W-phase) windings. Note that the present disclosure encompasses a power conversion device that converts power that is to be supplied to an n-phase motor having n phase windings (n is an integer of four or more), such as four phase windings or five phase windings.

First Embodiment

Figure 1:
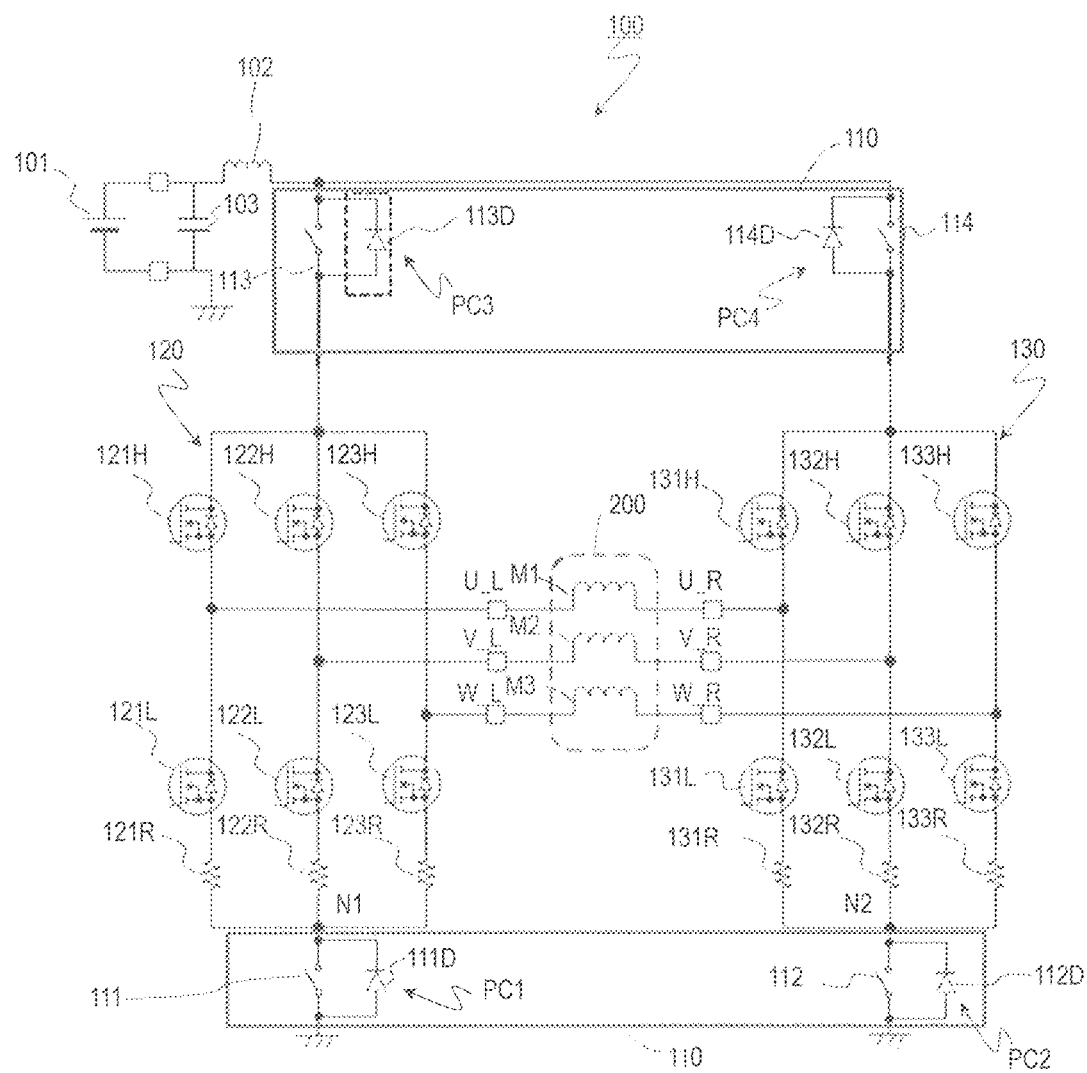
FIG. 1 is a circuit diagram showing a circuit configuration of a power conversion device 100 according to an illustrative first embodiment.

FIG. 1 schematically shows a circuit configuration of a power conversion device 100 according to this embodiment.

The power conversion device 100 includes two switch circuits 110, a first inverter 120, and a second inverter 130. The power conversion device 100 can convert power that is to be supplied to various motors. A motor 200 is, for example, a three-phase AC motor.

The motor 200 includes a U-phase winding M1, a V-phase winding M2, and a W-phase winding M3, and is coupled to the first inverter 120 and the second inverter 130. Specifically, the first inverter 120 is coupled to one end of each phase winding of the motor 200, and the second inverter 130 is coupled to the other end of each phase winding. As used herein, the terms "couple" and "connect" with respect to parts (components) mainly means an electrical coupling and connection between the parts. The first inverter 120 has terminals U_L, V_L, and W_L which correspond to the respective phases, and the second inverter 130 has terminals U_R, V_R, and W_R which correspond to the respective phases.

The terminal U_L of the first inverter 120 is coupled to one end of the U-phase winding M1, the terminal V_L is coupled to one end of the V-phase winding M2, and the terminal W_L is coupled to one end of the W-phase winding M3. As with the first inverter 120, the terminal U_R of the second inverter 130 is coupled to the other end of the U-phase winding M1, the terminal V_R is coupled to the other end of the V-phase winding M2, and the terminal W_R is coupled to the other end of the W-phase winding M3. Such coupling with a motor is different from the so-called star and delta couplings.

The two switch circuits 110 have first to fourth switch elements 111, 112, 113, and 114. Of the two switch circuits 110, one that includes the first and second switch elements 111 and 112 and is closer to the GND is hereinafter referred to as a "GND-side switch circuit," and one that includes the third and fourth switch elements 113 and 114 and is closer to the power supply is hereinafter referred to as a "power supply-side switch circuit." In other words, the GND-side switch circuit has the first and second switch elements 111 and 112, and the power supply-side switch circuit has the third and fourth switch elements 113 and 114.

In the power conversion device 100, the first inverter 120 and the second inverter 130 can be electrically connected to the power supply 101 and the GND by the two switch circuits 110.

Specifically, the first switch element 111 switches between connection and disconnection of the first inverter 120 to and from the GND. The second switch element 112 switches between connection and disconnection of the second inverter 130 to and from the GND. The third switch element 113 switches between connection and disconnection of the power supply 101 to and from the first inverter 120. The fourth switch element 114 switches between connection and disconnection of the power supply 101 to and from the second inverter 130.

The first to fourth switch elements 111, 112, 113, and 114 may be turned on and off under the control of, for example, a microcontroller or dedicated driver. The first to fourth switch elements 111, 112, 113, and 114 can block a current in the opposite directions. The first to fourth switch elements 111, 112, 113, and 114 may, for example, be a semiconductor switch such as a thyristor or analog switch IC, a mechanical relay, etc. A combination of a diode and an insulated-gate bipolar transistor (IGBT), etc., may be used. Note that the switch elements of the present disclosure include semiconductor switches such as a field-effect transistor in which a parasitic diode is formed (typically a MOSFET). An example circuit configuration in which MOSFETs are used as switch elements is described in another embodiment. The first to fourth switch elements 111, 112, 113, and 114 may be herein denoted by SWs 111, 112, 113, and 114, respectively.

A protection circuit is electrically connected in parallel to each SW in the two switch circuits 110. Specifically, a protection circuit PC1 is coupled in parallel to the SW 111, a protection circuit PC2 is coupled in parallel to the SW 112, a protection circuit PC3 is coupled in parallel to the SW 113, and a protection circuit PC4 is coupled in parallel to the SW 114. For example, the protection circuits PC1, PC2, PC3, and PC4 are diodes 111D, 112D, 113D, and 114D, respectively.

The present disclosure is not limited to the examples shown in the drawings. The number of switch elements that are used is determined as appropriate, taking into account design and specifications, etc. In particular, in the field of vehicle-mounted devices, high quality needs to be ensured for safety, and therefore, the power supply-side switch circuit and the GND-side switch circuit may include a plurality of switch elements for each inverter.

Figure 2:
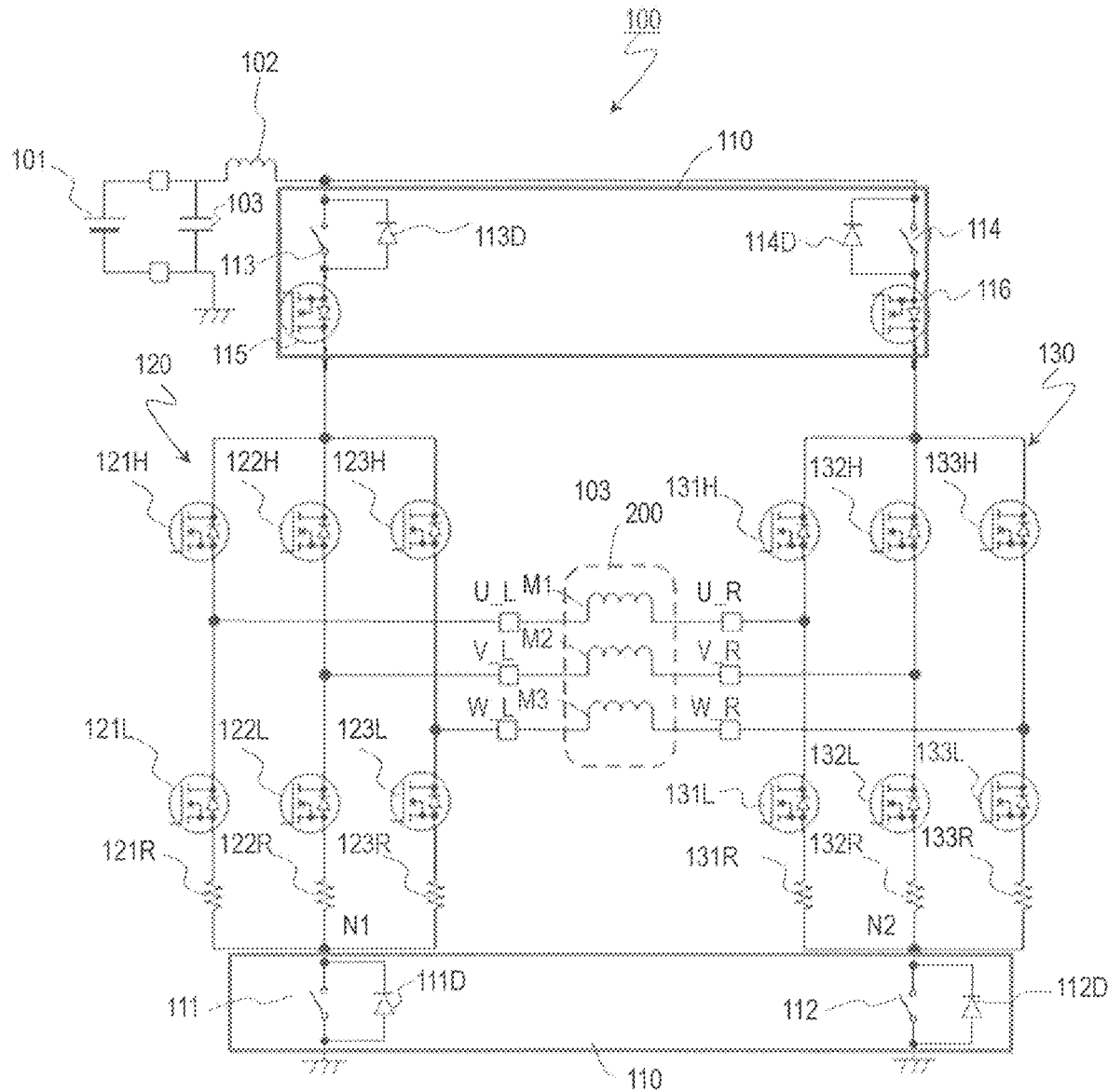
FIG. 2 is a circuit diagram showing another circuit configuration of the power conversion device 100 of the illustrative first embodiment.

FIG. 2 schematically shows another circuit configuration of the power conversion device 100 of this embodiment.

The power supply-side switch circuit 110 may further have a fifth switch element 115 and a sixth switch element 116 for reverse connection protection. The fifth and sixth switch elements 115 and 116 are typically a MOSFET semiconductor switch having a parasitic diode. The fifth switch element 115 is coupled in series to the SW 113, and is disposed such that a forward current flows through the parasitic diode in a direction toward the first inverter 120. The sixth switch element 116 is coupled in series to the SW 114, and is disposed such that a forward current flows through the parasitic diode in a direction toward the second inverter 130. Even if the power supply 101 is coupled in the reverse direction, a reverse current can be blocked by the two FETs for reverse connection protection.

Also in the example configuration of FIG. 2, a diode is coupled as a protection circuit in parallel to an SW in the power supply-side switch circuit 110. For example, a diode 113D may be coupled in parallel to the SW 113, and a diode 114D may be coupled in parallel to the SW 114.

The power supply 101 generates a predetermined power supply voltage. The power supply 101 may, for example, be a DC power supply. Note that the power supply 101 may be an AC/DC converter or DC/DC converter, or alternatively, a battery (electric battery).

The power supply 101 may be a single power supply that is shared by the first and second inverters 120 and 130. Alternatively, a first power supply for the first inverter 120 and a second power supply for the second inverter 130 may be provided.

A coil 102 is provided between the power supply 101 and the power supply-side switch circuit 110. The coil 102 functions as a noise filter to perform smoothing so that high-frequency noise contained in a voltage waveform supplied to each inverter or high-frequency noise occurring in each inverter does not flow into the power supply 101. A capacitor or capacitors 103 are coupled to power supply terminals of the inverters. The capacitor 103 is a so-called bypass capacitor, and prevents or reduces voltage ripple. The capacitor 103 is, for example, an electrolytic capacitor. The capacities and number of capacitors 103 that are used are determined as appropriate, taking into account design and specifications, etc.

The first inverter 120 (may also be referred to as a "bridge circuit L") includes a bridge circuit including three legs. Each leg has a low-side switching element and a high-side switching element. Switching elements 121L, 122L, and 123L shown in FIG. 1 are a low-side switching element, and switching elements 121H, 122H, and 123H shown in FIG. 1 are a high-side switching element. The switching elements may, for example, be a FET or IGBT. In the description that follows, it is, for example, assumed that the switching elements are a FET, and may be denoted by FETs. For example, the switching elements 121L, 122L, and 123L are denoted by FETs 121L, 122L, and 123L.

Figure 5:
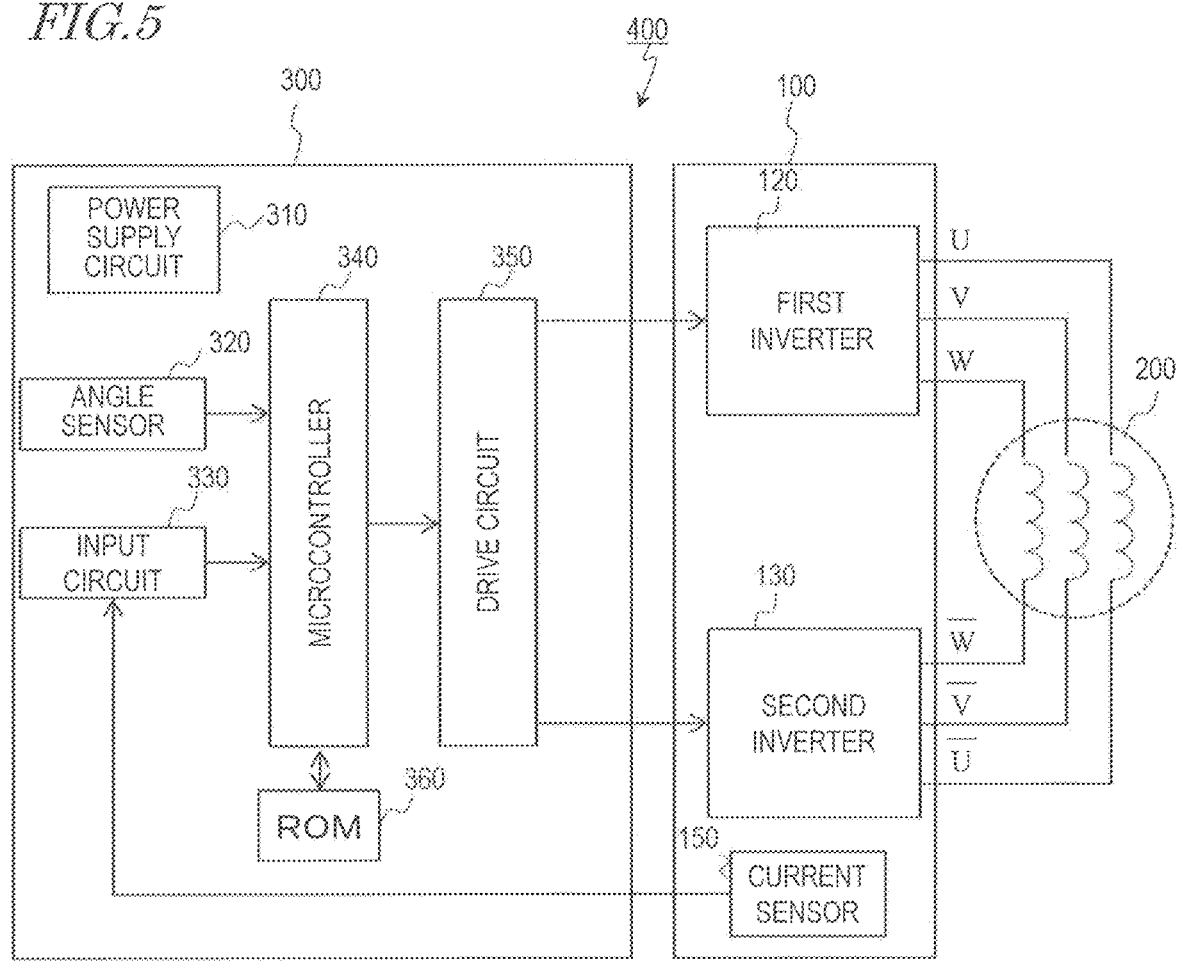
FIG. 5 is a block diagram showing a typical configuration of a motor drive unit 400 including the power conversion device 100.

The first inverter 120 includes three shunt resistors 121R, 122R, and 123R as a current sensor for detecting currents flowing through the U-phase, V-phase, and W-phase windings, respectively (see FIG. 5). The current sensor 150 includes a current detection circuit (not shown) for detecting a current flowing through each shunt resistor. For example, the shunt resistors 121R, 122R, and 123R are each coupled between the corresponding one of the three low-side switching elements included in the three legs of the first inverter 120, and the GND. Specifically, the shunt resistor 121R is electrically connected between the FET 121L and the SW 111, the shunt resistor 122R is electrically connected between the FET 122L and the SW 111, and the shunt resistor 123R is electrically connected between the FET 123L and the SW 111. The shunt resistors have a resistance value of, for example, about 0.5-1.0 mΩ.

As with the first inverter 120, the second inverter 130 (may be denoted by a "bridge circuit R") includes a bridge circuit including three legs. FETs 131L, 132L, and 133L shown in FIG. 1 are a low-side switching element, and FETs 131H, 132H, and 133H are a high-side switching element. The second inverter 130 also includes three shunt resistors 131R, 132R, and 133R. The shunt resistors are coupled between the three low-side switching elements included in the three legs, and the GND. Each of the FETs included in the first and second inverters 120 and 130 may be controlled by, for example, a microcontroller or dedicated driver.

In the example configuration of FIG. 1, a shunt resistor is provided in each leg of each inverter. Note that the first and second inverters 120 and 130 can include six or less shunt resistors. For example, the six or less shunt resistors can be coupled between the six or less low-side switching elements of the six legs of the first and second inverters 120 and 130, and the GND. In the case where this configuration is extended to an n-phase motor, the first and second inverters 120 and 130 can include 2n or less shunt resistors. For example, the 2n or less shunt resistors can be coupled between the 2n or less low-side switching elements of the 2n legs of the first and second inverters 120 and 130, and the GND.

Figure 3:
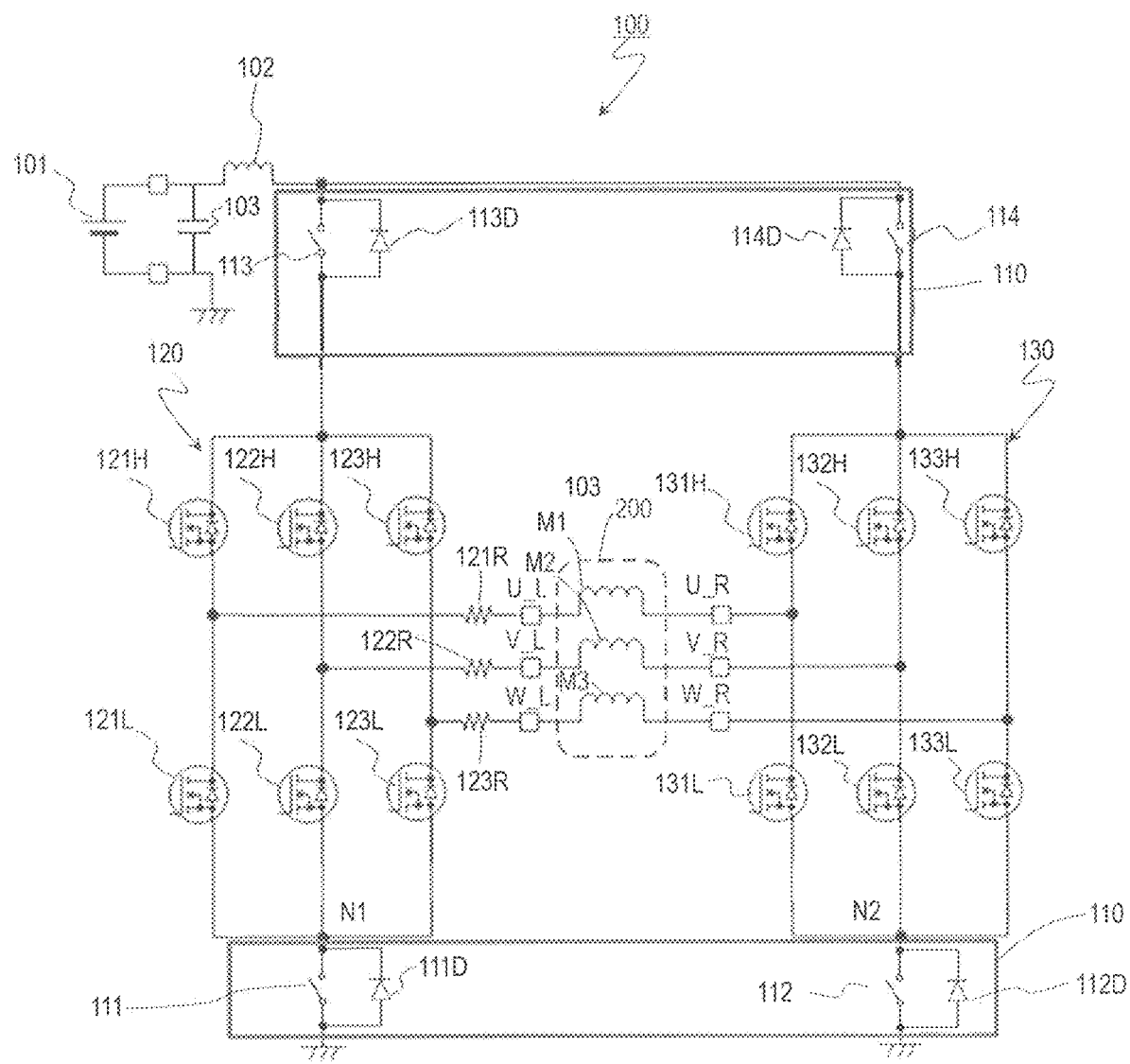
FIG. 3 is a circuit diagram showing still another circuit configuration of the power conversion device 100 of the illustrative first embodiment.
Figure 4:
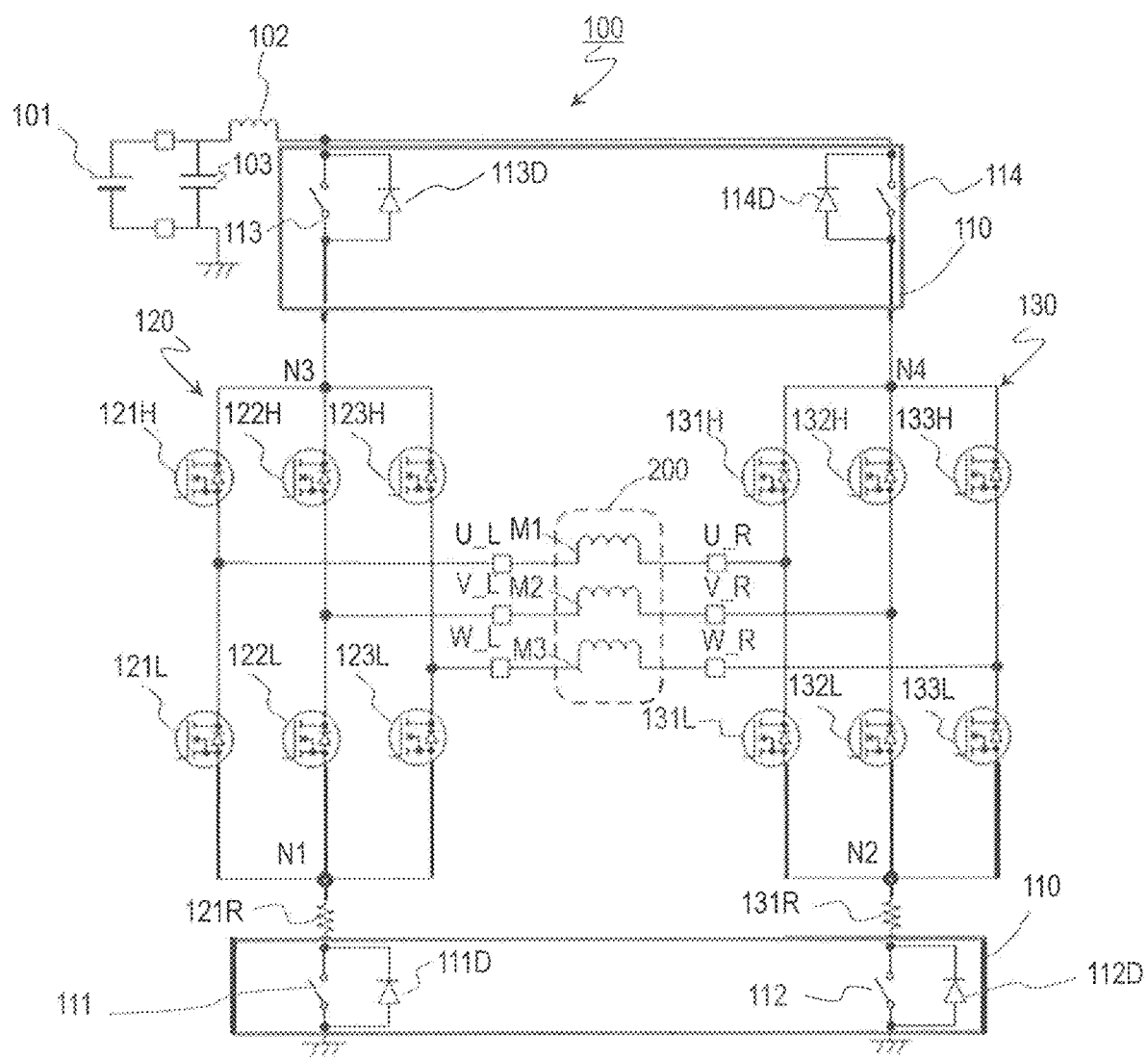
FIG. 4 is a circuit diagram showing still another circuit configuration of the power conversion device 100 of the illustrative first embodiment.

FIGS. 3 and 4 schematically show other circuit configurations of the power conversion device 100 of this embodiment.

As shown in FIG. 3, three shunt resistors can be disposed between the legs of the first or second inverter 120 or 130 and the windings M1, M2, and M3. For example, shunt resistors 121R, 122R, and 123R may be disposed between the first inverter 120 and one end of the respective windings M1, M2, and M3. Alternatively, for example, although not shown, shunt resistors 121R and 122R may be disposed between the first inverter 120 and one end of the respective windings M1 and M2, and a shunt resistor 123R may be disposed between the second inverter 130 and the other end of the winding M3. In such a configuration, it is sufficient to dispose three shunt resistors for the U-, V-, and W-phases, and at least two shunt resistors are provided.

As shown in FIG. 4, for example, a single shunt resistor may be provided in each inverter and shared by the phase windings. A single shunt resistor may, for example, be electrically connected between a low-side node N1 (coupling point of the legs) of the first inverter 120, and the SW 111, and another single shunt resistor may, for example, be electrically connected between a low-side node N2 of the second inverter 130, and the SW 112.

As with the low side, a single shunt resistor is, for example, electrically connected between a high-side node N3 of the first inverter 120, and the SW 113, and another single shunt resistor is, for example, electrically connected between a high-side node N4 of the second inverter 130, and the SW 114. Thus, the number of shunt resistors that are used, and the arrangement of the shunt resistors, are determined as appropriate, taking into account manufacturing cost, design, specifications, etc.

FIG. 5 schematically shows a typical block configuration of a motor drive unit 400 that includes the power conversion device 100.

The motor drive unit 400 includes the power conversion device 100, the motor 200, and a control circuit 300.

The control circuit 300 includes, for example, a power supply circuit 310, an angle sensor 320, an input circuit 330, a microcontroller 340, a drive circuit 350, and a ROM 360. The control circuit 300 is coupled to the power conversion device 100, and controls the power conversion device 100 to drive the motor 200.

Specifically, the control circuit 300 controls the rotor such that the rotor takes a desired position, rotational speed, and current, etc., and can achieve closed-loop control. Note that the control circuit 300 may include a torque sensor instead of the angle sensor. In this case, the control circuit 300 can control the rotor such that the rotor takes a desired motor torque.

The power supply circuit 310 generates a DC voltage (e.g., 3 V or 5 V) used for the circuit blocks. The angle sensor 320 is, for example, a resolver or Hall IC. Alternatively, the angle sensor 320 may be implemented by a combination of a magnetic reluctance (MR) sensor having an MR element, and a sensor magnet. The angle sensor 320 detects the angle of rotation of the rotor of the motor 200 (hereinafter referred to as a "rotation signal"), and outputs the rotation signal to the microcontroller 340. The input circuit 330 receives a motor current value (hereinafter referred to as an "actual current value") detected by the current sensor 150, and if necessary, converts the level of the actual current value into an input level of the microcontroller 340, and outputs the resultant actual current value to the microcontroller 340.

The microcontroller 340 controls the switching operation (turning-on or turning-off) of each FET in the first and second inverters 120 and 130 of the power conversion device 100. The microcontroller 340 calculates a desired current value on the basis of the actual current value and the rotor rotation signal, etc., to generate a PWM signal, and outputs the PWM signal to the drive circuit 350. The microcontroller 340 can also control the on/off operation of each SW in the two switch circuits 110 of the power conversion device 100.

The drive circuit 350 is typically a gate driver. The drive circuit 350 generates control signals (gate control signals) for controlling the switching operations of the respective FETs in the first and second inverters 120 and 130, on the basis of the PWM signal, and outputs the control signals to the gates of the respective FETs. The drive circuit 350 also generates control signals for controlling the on/off operations of the respective SWs in the two switch circuits 110 according to an instruction from the microcontroller 340. Note that the microcontroller 340 may control each SW in the two switch circuits 110. Note that the microcontroller 340 may also function as the drive circuit 350. In this case, the control circuit 300 may not include the drive circuit 350.

The ROM 360 is, for example, a writable memory (e.g., a PROM), rewritable memory (e.g., a flash memory), or read-only memory. The ROM 360 stores a control program including instructions to cause the microcontroller 340 to control the power conversion device 100. For example, the control program is temporarily loaded to a RAM (not shown) during booting.

The power conversion device 100 performs control under normal conditions and control under abnormal conditions. The control circuit 300 (mainly the microcontroller 340) can switch the control of the power conversion device 100 from the control under normal conditions to the control under abnormal conditions. The on/off-state of each SW in the two switch circuits 110 is determined on the basis of a pattern of a failed FET or FETs (hereinafter also referred to as a "failure pattern"). The on/off-state of each FET in a failed inverter is also determined.

(1. Control Under Normal Conditions)

Firstly, a specific example method for controlling the power conversion device 100 under normal conditions will be described. As described above, the term "normal conditions" means that none of the FETs in the first and second inverters 120 and 130 has failed, and none of the SWs of the two switch circuits 110 has failed.

Under normal conditions, the control circuit 300 turns on all the SWs 111, 112, 113, and 114 of the two switch circuits 110. As a result, the power supply 101 and the first inverter 120 are electrically connected together, and the power supply 101 and the second inverter 130 are electrically connected together. In addition, the first inverter 120 and the GND are electrically connected together, and the second inverter 130 and the GND are electrically connected together. In this connection state, the control circuit 300 performs three-phase conduction control using both of the first and second inverters 120 and 130 to drive the motor 200.

Figure 6:
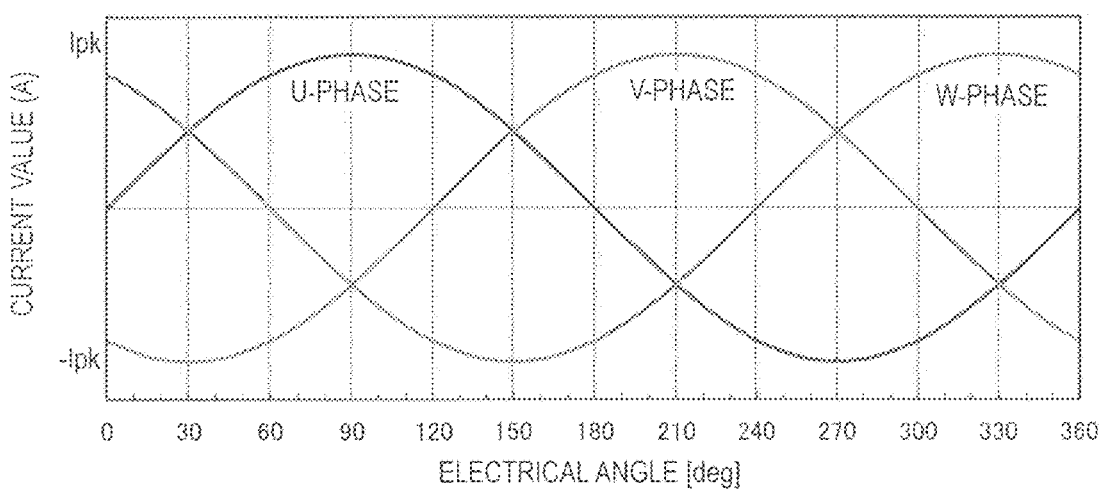
FIG. 6 is a diagram showing current waveforms (sine waves) that are obtained by plotting values of currents flowing through a U-phase, a V-phase, and a W-phase winding of a motor 200 when the power conversion device 100 is controlled by three-phase conduction control.

FIG. 6 shows example current waveforms (sine waves) that are obtained by plotting values of currents flowing through the U-phase, V-phase, and W-phase windings of the motor 200 when the power conversion device 100 is controlled by the three-phase conduction control. The horizontal axis represents motor electrical angles (deg), and the vertical axis represents current values (A). In the current waveforms of FIG. 6, current values are plotted every electrical angle of 30°. $I_{pk}$ represents the greatest current value (peak current value) of each phase.

Table 1 shows the values of currents flowing through the terminals of each inverter every predetermined electrical angle of the sine waves of FIG. 6. Specifically, Table 1 shows the values of currents flowing through the terminals U_L, V_L, and W_L of the first inverter 120 (the bridge circuit L) every electrical angle of 30°, and the values of currents flowing through the terminals U_R, V_R, and W_R of the second inverter 130 (the bridge circuit R) every electrical angle of 30°. Here, a positive current direction with respect to the bridge circuit L is defined as a direction in which a current flows from a terminal of the bridge circuit L to a terminal of the bridge circuit R. This definition applies to current directions shown in FIG. 6. A positive current direction with respect to the bridge circuit R is defined as a direction in which a current flows from a terminal of the bridge circuit R to a terminal of the bridge circuit L. Therefore, there is a phase difference of 180° between the current in the bridge circuit L and the current in the bridge circuit R. In Table 1, the magnitude of a current value $I_1$ is $[(3)^{1/2}/2]*I_{pk}$, and the magnitude of a current value $I_2$ is $I_{pk}/2$.

TABLE 1

| | | Electrical angles [deg] | | | | | | | | | | |
|---|---|---|---|---|---|---|---|---|---|---|---|---|
| Operation under normal conditions | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | C | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 0°, a current does not flow through the U-phase winding M1. A current having a magnitude of $I_1$ flows through the V-phase winding M2 from the bridge circuit R to the bridge circuit L, and a current having a magnitude of $I_1$ flows through the W-phase winding M3 from the bridge circuit L to the bridge circuit R.

At an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R.

At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3.

At an electrical angle of 90°, a current having a magnitude of $I_{pk}$ flows through the U-phase winding M1 from the bridge circuit L to the bridge circuit R, a current having a magnitude of $I_2$ flows through the V-phase winding M2 from the bridge circuit R to the bridge circuit L, and a current having a magnitude of $I_2$ flows through the W-phase winding M3 from the bridge circuit R to the bridge circuit L.

At an electrical angle of 120°, a current having a magnitude of $I_1$ flows through the U-phase winding M1 from the bridge circuit L to the bridge circuit R, and a current having a magnitude of $I_1$ flows through the W-phase winding M3 from the bridge circuit R to the bridge circuit L. A current does not flow through the V-phase winding M2.

At an electrical angle of 150°, a current having a magnitude of $I_2$ flows through the U-phase winding M1 from the bridge circuit L to the bridge circuit R, a current having a magnitude of $I_2$ flows through the V-phase winding M2 from the bridge circuit L to the bridge circuit R, and a current having a magnitude of $I_{pk}$ flows through the W-phase winding M3 from the bridge circuit R to the bridge circuit L.

At an electrical angle of 180°, a current does not flow through the U-phase winding M1. A current having a magnitude of $I_1$ flows through the V-phase winding M2 from the bridge circuit L to the bridge circuit R, and a current having a magnitude of $I_1$ flows through the W-phase winding M3 from the bridge circuit R to the bridge circuit L.

At an electrical angle of 210°, a current having a magnitude of $I_2$ flows through the U-phase winding M1 from the bridge circuit R to the bridge circuit L, a current having a magnitude of $I_{pk}$ flows through the V-phase winding M2 from the bridge circuit L to the bridge circuit R, and a current having a magnitude of $I_2$ flows through the W-phase winding M3 from the bridge circuit R to the bridge circuit L.

At an electrical angle of 240°, a current having a magnitude of $I_1$ flows through the U-phase winding M1 from the bridge circuit R to the bridge circuit L, and a current having a magnitude of $I_1$ flows through the V-phase winding M2 from the bridge circuit L to the bridge circuit R. A current does not flow through the W-phase winding M3.

At an electrical angle of 270°, a current having a magnitude of $I_{pk}$ flows through the U-phase winding M1 from the bridge circuit R to the bridge circuit L, a current having a magnitude of $I_2$ flows through the V-phase winding M2 from the bridge circuit L to the bridge circuit R, and a current having a magnitude of $I_2$ flows through the W-phase winding M3 from the bridge circuit L to the bridge circuit R.

At an electrical angle of 300°, a current having a magnitude of $I_1$ flows through the U-phase winding M1 from the bridge circuit R to the bridge circuit L, and a current having a magnitude of $I_1$ flows through the W-phase winding M3 from the bridge circuit L to the bridge circuit R. A current does not flow through the V-phase winding M2.

At an electrical angle of 330°, a current having a magnitude of $I_2$ flows through the U-phase winding M1 from the bridge circuit R to the bridge circuit L, a current having a magnitude of $I_2$ flows through the V-phase winding M2 from the bridge circuit R to the bridge circuit L, and a current having a magnitude of $I_{pk}$ flows through the W-phase winding M3 from the bridge circuit L to the bridge circuit R.

In a typical Y-connected motor, the sum of currents flowing through the three phase windings is "0" at any electrical angle, where the directions of currents are taken into account. Note that, in the three-phase conduction control of the circuit configuration of the present disclosure, currents flowing through the three phase windings are separately controlled, and therefore, typically, a zero-phase current may flow. As a result, a control error may occur due to the influence of the zero-phase current. It should be noted that the sum of currents flowing through the three phase windings is not exactly "0" at any electrical angle. For example, the control circuit 300 can control the switching operations of the FETs of the bridge circuits L and R by PWM control such that the current waveforms of FIG. 6 are obtained.

(2. Control Under Abnormal Conditions)

As described above, the term "abnormal conditions" mainly means that a FET(s) has failed. Failures of a FET are roughly divided into an "open-circuit failure" and a "short-circuit failure." The "open-circuit failure" with respect to a FET means that there is an open circuit between the source and drain of the FET (in other words, a resistance rds between the source and drain has a high impedance). The "short-circuit failure" with respect to a FET means that there is a short circuit between the source and drain of the FET.

The "open-circuit failure" with respect to a switching element SW means that the SW is always off (blocked), and is not turned on (i.e., is not put into a conductive state). The "short-circuit failure" with respect to a switching element SW means that the SW is always on, and is not turned off.

Referring back to FIG. 1, it is considered that, during the operation of the power conversion device 100, a random failure occurs in which one of the 16 FETs randomly fails. The present disclosure is mainly directed to a method for controlling the power conversion device 100 when a random failure has occurred. Note that the present disclosure is also directed to a method for controlling the power conversion device 100 when multiple FETs have failed together, etc. Such a multi-failure means that, for example, a failure occurs in the high-side and low-side switching elements of one leg simultaneously.

When the power conversion device 100 is used for a long period of time, a random failure is likely to occur. Note that the random failure is different from the manufacture failure that may occur during manufacture. When even one of the FETs of the two inverters fails, the normal three-phase conduction control can be no longer carried out.

A failure may be detected as follows, for example. The drive circuit 350 monitors the drain-source voltage Vds of a FET, and compares Vds with a predetermined threshold voltage, in order to detect a failure in the FET. The threshold voltage is set in the drive circuit 350 by, for example, data communication with an external IC (not shown), and an external part. The drive circuit 350 is coupled to a port of the microcontroller 340, and sends a failure detection signal to the microcontroller 340. For example, the drive circuit 350, when detecting a failure in a FET, asserts the failure detection signal. The microcontroller 340, when receiving an asserted failure detection signal, reads internal data from the drive circuit 350, and determines which of the FETs has failed.

Alternatively, a failure may be detected as follows, for example. The microcontroller 340 can detect a failure in a FET on the basis of a difference between an actual current value of the motor and a desired current value. Note that the failure detection is not limited to these techniques, and may be performed using a wide variety of known techniques related to the failure detection.

A failure in each SW of the switch circuits 110 can, for example, be detected by the microcontroller 340 monitoring a current flowing through the SW.

The microcontroller 340, when receiving an asserted failure detection signal, switches the control of the power conversion device 100 from the control under normal conditions to the control under abnormal conditions. For example, a timing at which the control of the power conversion device 100 is switched from the control under normal conditions to the control under abnormal conditions is about 10-30 msec after the assertion of a failure detection signal.

The failure of the power conversion device 100 includes various failure patterns. Failure patterns will now be classified, and the control under abnormal conditions of the power conversion device 100 will now be described in detail for each pattern. In this embodiment, of the two inverters, the first inverter 120 is assumed to be a failed inverter, and the second inverter 130 is assumed to be operating normally.

(2-1. High-Side Switching Element Open-Circuit Failure)

The control under abnormal conditions will be described that is performed in the event of an open-circuit failure in at least one of the three high-side switching elements in the bridge circuit of the first inverter 120.

It is assumed that, of the high-side switching elements (the FETs 121H, 122H, and 123H) of the first inverter 120, an open-circuit failure has occurred in the FET 121H. Note that, in the event of an open-circuit failure in the FET 122H or 123H, the power conversion device 100 can also be controlled by a control method described below.

In the event of an open-circuit failure in the FET 121H, the control circuit 300 puts the SWs 111, 112, 113, and 114 of the two switch circuits 110 and the FETs 122H, 123H, 121L, 122L, and 123L of the first inverter 120 into a first state. In the first state, the SWs 111 and 113 are off and the SWs 112 and 114 are on in the two switch circuits 110. In addition, the FETs 122H and 123H other than the failed FET 121H (the high-side switching elements other than the failed FET 121H) are off and the FETs 121L, 122L, and 123L are on in the first inverter 120.

In the first state, the first inverter 120 is electrically disconnected from the power supply 101 and the GND, and the second inverter 130 is electrically connected to the power supply 101 and the GND. In other words, when the first inverter 120 is not operating normally, the SW 113 breaks the connection between the power supply 101 and the first inverter 120, and the SW 111 breaks the connection between the first inverter 120 and the GND. In addition, all the three low-side switching elements are turned on so that the low-side node N1 functions as a neutral point for the windings. As used herein, the term "a neutral point is formed" means that a certain node functions as the neutral point. The power conversion device 100 drives the motor 200 using a neutral point that is formed on the low side of the first inverter 120, and the second inverter 130.

As described above, in the three-phase conduction control, a zero-phase current may flow in the circuit. Here, it is assumed that, unlike the present disclosure, none of the two switch circuits 110 has a protection circuit. It is also assumed that the control circuit 300 switches the control from the control under normal conditions to the control under abnormal conditions. For example, the FETs 121L, 122L, and 123L of the first inverter 120 are turned on so that a neutral point is formed on the low side. In this situation, if the SWs 111 and 113 are turned off, the node N1 at which one end of each of the windings M1, M2, and M3 is coupled to each other, i.e., the neutral point on the low side, is insulated from the power supply 101 and the GND. Therefore, the current path of the zero-phase current that has existed so far is suddenly cut or removed. As a result, an overvoltage occurs, which may induce a failure in an electronic component, such as a FET, in the circuit.

In the power conversion device 100 of this embodiment, a protection circuit is coupled in parallel to each of SWs 111, 112, 113, and 114. Even when the SWs 111 and 113 are turned off, the neutral point in the first inverter 120 is not insulated from the power supply 101 or the GND. Therefore, the path of the zero-phase current can be ensured by the protection circuits. The zero-phase current can flow through the diode 111D of the protection circuit PC1 or the diode 113D of the protection circuit PC3. In other words, when a neutral point is formed in one of the inverters, the zero-phase current remaining in the circuit can be caused to flow out through a protection circuit. As a result, a failure in an electronic component in the circuit can be effectively prevented or reduced.

After turning on the FETs 121L, 122L, and 123L, the control circuit 300 may turn off the SWs 111 and 113 at the time when some portion of the zero-phase current has flown out through a protection circuit and therefore the zero-phase current is small. For example, the control circuit 300 firstly turns on the FETs 121L, 122L, and 123L. The control circuit 300 may monitor the zero-phase current, and turn off the SWs 111 and 113 after having confirmed that the zero-phase current is less than a predetermined value. This control can more reliably prevent or reduce a failure in the SWs 111 and 113 and each FET.

Figure 7:
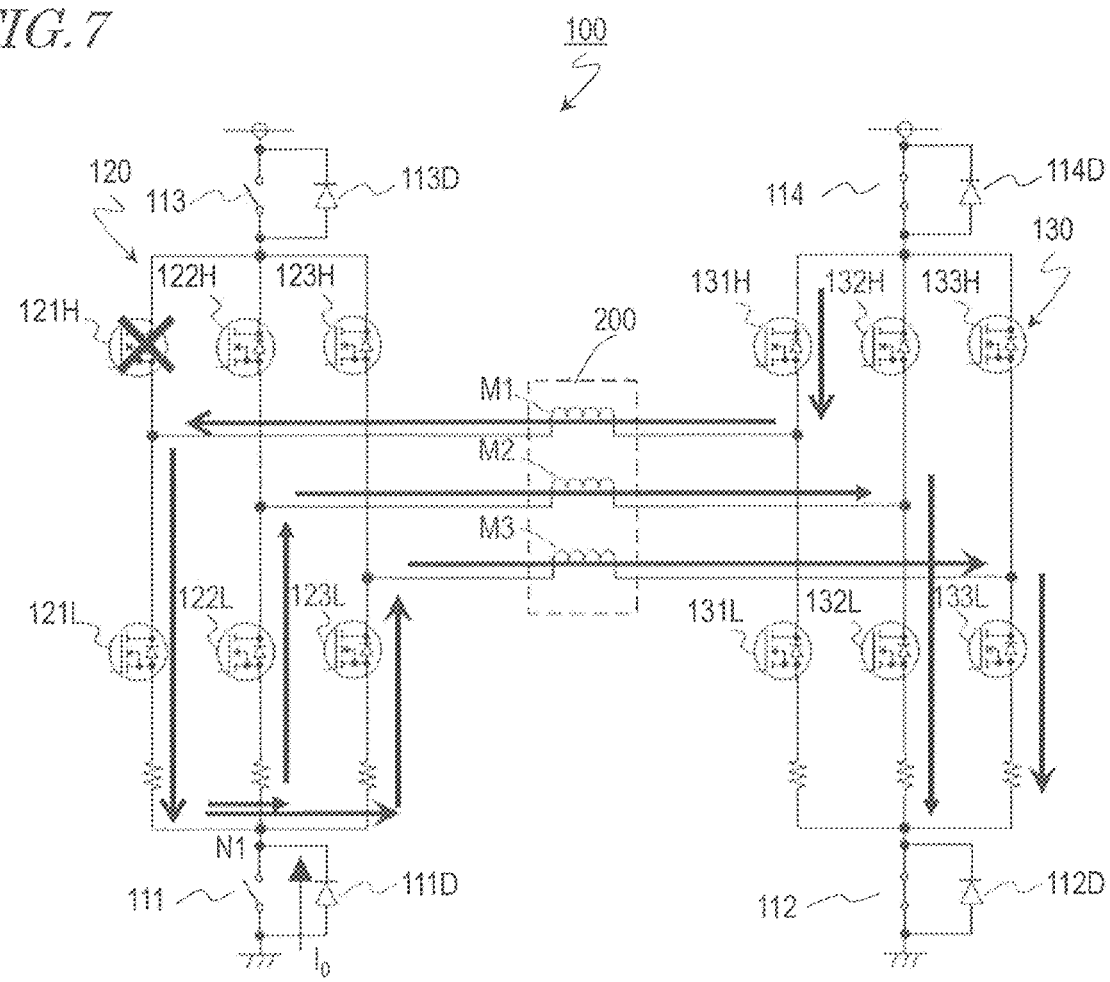
FIG. 7 is a schematic diagram showing flows of currents in the power conversion device 100 that occur when SWs of two switch circuits 110 and FETs of a first inverter 120 are in a first state.
Figure 8:
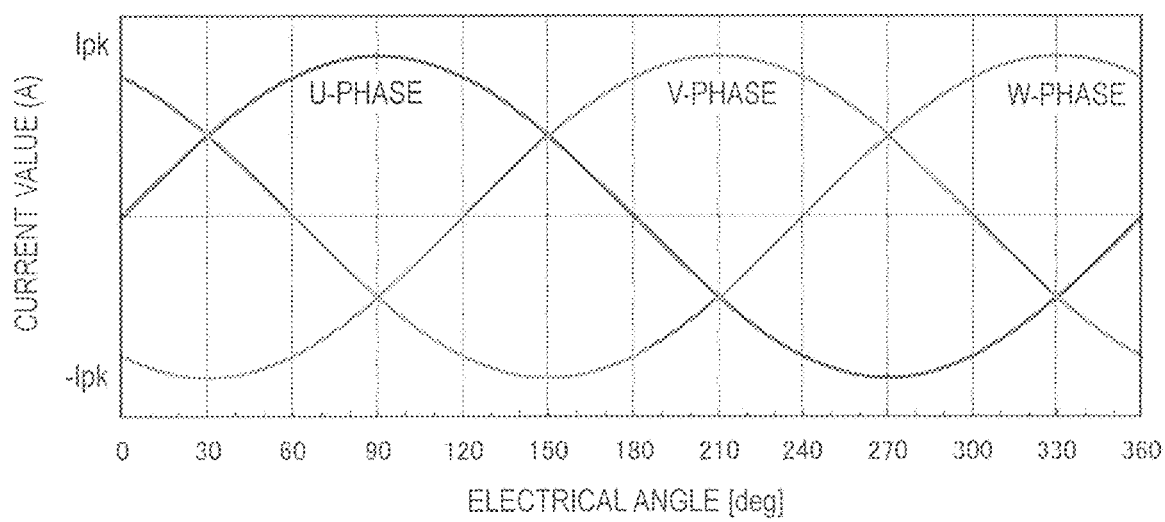
FIG. 8 is a diagram showing current waveforms that are obtained by plotting values of currents flowing through the U-phase, V-phase, and W-phase winding of the motor 200 when the power conversion device 100 is controlled in the first state.

FIG. 7 schematically shows flows of currents in the power conversion device 100 that occur when the SWs of the two switch circuits 110 and the FETs of the first inverter 120 are in the first state. FIG. 8 shows example current waveforms that are obtained by plotting values of currents flowing through the U-phase, V-phase, and W-phase windings in the motor 200 when the power conversion device 100 is controlled in the first state. FIG. 7 shows flows of currents that occur at a motor electrical angle of, for example, 270°. The three solid lines represent currents flowing from the power supply 101 to the motor 200. In the state shown in FIG. 7, the FETs 131H, 132L, and 133L are on and the FETs 131L, 132H, and 133H are off in the second inverter 130. A current flowing through the FET 131H of the second inverter 130 flows through the winding M1 and the FET 121L of the first inverter 120 to the neutral point. A portion of the current flows through the FET 122L to the winding M2, and the remaining portion of the current flows through the FET 123L to the winding M3. The currents flowing through the windings M2 and M3 flow through the SW 112 for the second inverter 130 to the GND.

FIG. 7 shows a zero-phase current $I_0$ that may flow through the diode 111D of the protection circuit PC1 when the control is switched from the control under normal conditions to the control under abnormal conditions. When the zero-phase current has a negative value, a forward current can flow through the diode 111D.

Table 2 shows example values of currents flowing through terminals of the second inverter 130 every predetermined electrical angle of the current waveforms of FIG. 8. Specifically, Table 2 shows examples values of currents flowing through the terminals U_R, V_R, and W_R of the second inverter 130 (the bridge circuit R) every electrical angle of 30°. The definitions of the directions of currents are as described above. Note that, according to the definitions of the current directions, the sign (positivity or negativity) of each current value shown in FIG. 8 is opposite to that shown in Table 2 (phase difference: 180°).

electrical angle. The control circuit 300 can control the switching operations of the FETs of the bridge circuit R by PWM control such that, for example, the current waveforms of FIG. 8 are obtained.

As can be seen from Tables 1 and 2, motor currents flowing through the motor 200 at any electrical angle are the same between the control under normal conditions and the control under abnormal conditions. Therefore, compared to the control under normal conditions, the motor assistive torque is not reduced in the control under abnormal conditions.

The power supply 101 is not electrically connected to the first inverter 120, and therefore, a current does not flow from the power supply 101 into the first inverter 120. In addition, the first inverter 120 is not electrically connected to the GND, and therefore, a current flowing through the neutral point does not flow to the GND. As a result, a power loss can be prevented or reduced, and suitable current control can be achieved by the formation of a closed loop of a drive current.

In the event of an open-circuit failure in a high-side switching element (the FET 121H), the state of the SWs of the two switch circuits 110 and the FETs of the first inverter 120 is not limited to the first state. For example, the control circuit 300 may put these SWs and FETs into a second state. In the second state, the SW 113 is on and the SW 111 is off, and the SWs 112 and 114 are on, in the two switch circuits 110. In addition, the FETs 122H and 123H other than the failed FET 121H are off, and the FETs 121L, 122L, and 123L are on, in the first inverter 120. The first state is different from the second state in whether or not the SW 113 is on. A reason why the SW 113 may be on is that, in the event of an open-circuit failure in the FET 121H, if the FETs 122H and 123H are controlled to be off, all the high-side switching elements are put into the open state, and therefore, in this case, even when the SW 113 is on, a current does not flow from the power supply 101 to the first inverter 120. Thus, in the event of an open-circuit failure, the SW 113 may be either on or off.

(2-2. High-Side Switching Element Short-Circuit Failure)

The control under abnormal conditions will be described that is performed in the event of a short-circuit failure in one

TABLE 2

| | | Electrical angles [deg] | | | | | | | | | | |
|---|---|---|---|---|---|---|---|---|---|---|---|---|
| Operation under normal conditions | | 0 (360) | 30 | 60 | 90 | 120 | 150 | 180 | 210 | 240 | 270 | 300 | 330 |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R chase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R. At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3. The sum of a current(s) flowing into a neutral point and a current(s) flowing out of the neutral point is "0" at any of the three high-side switching elements in the bridge circuit of the first inverter 120.

It is assumed that a short-circuit failure has occurred in the FET 121H of the high-side switching elements (the FETs 121H, 122H, and 123H) of the first inverter 120. Note that, in the event of a short-circuit failure in the FET 122H or 123H, the power conversion device 100 can also be controlled using a control method described below.

In the event of a short-circuit failure in the FET 121H, the control circuit 300 puts the SWs 111, 112, 113, and 114 of the two switch circuits 110 and the FETs 122H, 123H, 121L, 122L, and 123L of the first inverter 120 into the first state. Note that, in the event of a short-circuit failure, if the SW 113 is turned on, a current flows from the power supply 101 into the short-circuited FET 121H. Therefore, the control in the second state is forbidden.

As in the event of an open-circuit failure, all the three low-side switching elements are turned on so that a neutral point for the windings is formed at the low-side node N1. The power conversion device 100 drives the motor 200 using the neutral point on the low side of the first inverter 120, and the second inverter 130. The control circuit 300 can control the switching operations of the FETs of the bridge circuit R by PWM control such that, for example, the current waveforms of FIG. 8 are obtained. For example, in the first state in the event of a short-circuit failure, the flows of currents flowing in the power conversion device 100 at an electrical angle of 270° are as shown in FIG. 7. In addition, the values of currents flowing through the windings every predetermined motor electrical angle are as shown in Table 2.

In this control, the power supply 101 is not electrically connected to the first inverter 120, and therefore, a current does not flow from the power supply 101 into the first inverter 120. In addition, the first inverter 120 is not electrically connected to the GND, and therefore, a current flowing through the neutral point does not flow to the GND.

(2-3. Low-Side Switching Element Open-Circuit Failure)

The control under abnormal conditions will be described that is performed in the event of an open-circuit failure in one of the three low-side switching elements in the bridge circuit of the first inverter 120.

It is assumed that, of the low-side switching elements (the FETs 121L, 122L, and 123L) of the first inverter 120, an open-circuit failure has occurred in the FET 121L. Note that, in the event of an open-circuit failure in the FET 122L or 123L, the power conversion device 100 can also be controlled by a control method described below.

In the event of an open-circuit failure in the FET 121L, the control circuit 300 puts the SWs 111, 112, 113, and 114 of the two switch circuits 110 and the FETs 121H, 122H, 123H, 122L, and 123L of the first inverter 120 into a third state. In the third state, the SWs 111 and 113 are off and the SWs 112 and 114 are on in the two switch circuits 110. In addition, the FETs 122L and 123L other than the failed FET 121L (the low-side switching elements other than the failed FET 121L) are off, and the FETs 121H, 122H, and 123H are on, in the first inverter 120.

In the third state, the first inverter 120 is electrically disconnected from the power supply 101 and the GND, and the second inverter 130 is electrically connected to the power supply 101 and the GND. In addition, all the three high-side switching elements of the first inverter 120 are on, and therefore, a neutral point for the windings is formed at the high-side node N3.

Figure 9:
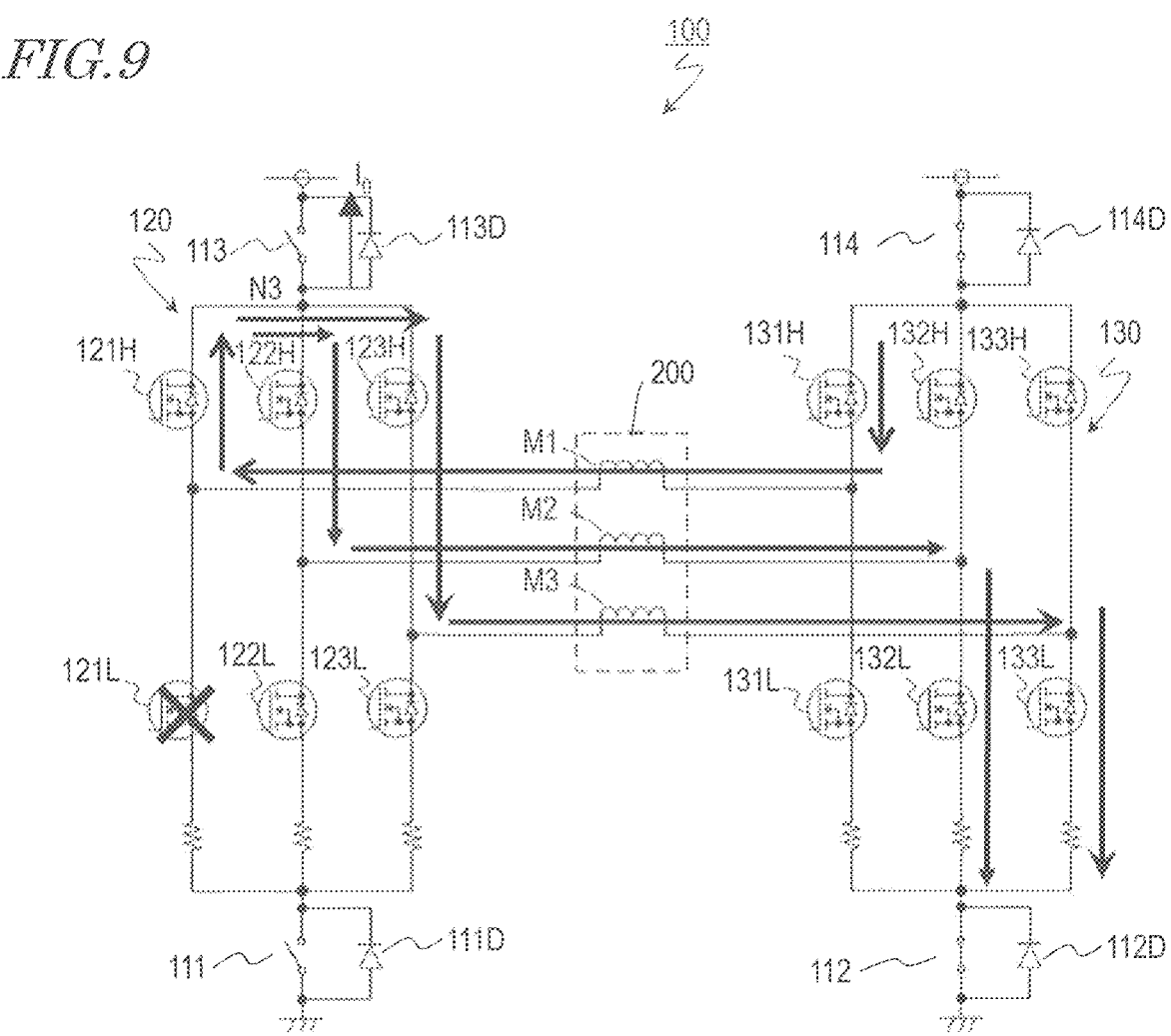
FIG. 9 is a schematic diagram showing flows of currents in the power conversion device 100 that occur when the SWs of the two switch circuits 110 and the FETs of the first inverter 120 are in a third state.

FIG. 9 schematically shows flows of currents in the power conversion device 100 that occur when the SWs of the two switch circuits 110 and the FETs of the first inverter 120 are in the third state. FIG. 9 shows flows of currents at a motor electrical angle of, for example, 270°. The three solid lines represent currents flowing from the power supply 101 to the motor 200.

In the state shown in FIG. 9, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the SW 112 for the second inverter 130 to the GND.

FIG. 9 shows a zero-phase current $I_0$ that may flow through the diode 113D of the protection circuit PC3 when the control is switched from the control under normal conditions to the control under abnormal conditions. When the zero-phase current has a positive value, a forward current may flow through the diode 113D.

The power conversion device 100 drives the motor 200 using the neutral point formed on the high side of the first inverter 120, and the second inverter 130. The control circuit 300 can control the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, the first inverter 120 is not electrically connected to the GND, and therefore, a current does not flow from the first inverter 120 to the GND.

In the event of an open-circuit failure in the low-side switching element (the FET 121L), the state of the SWs of the two switch circuits 110 and the FETs of the first inverter 120 is not limited to the third state. For example, the control circuit 300 may put these SWs and FETs into a fourth state. In the fourth state, the SW 113 is off and the SW 111 is on, and the SWs 112 and 114 are on, in the two switch circuits 110. In addition, the FETs 122L and 123L other than the failed FET 121L are off, and the FETs 121H, 122H, and 123H are on, in the first inverter 120. The third state is different from the fourth state in whether or not the SW 111 is on. A reason why the SW 111 may be on is that, in the event of an open-circuit failure in the FET 121L, if the FETs 122L and 123L are controlled to be off, all the low-side switching elements are put into the open state, and therefore, in this case, even when the SW 111 is on, a current does not flow to the GND. Thus, in the event of an open-circuit failure, the SW 111 may be either on or off.

(2-4. Low-Side Switching Element Short-Circuit Failure)

The control under abnormal conditions will be described that is performed in the event of a short-circuit failure in one of the three low-side switching elements in the bridge circuit of the first inverter 120.

It is assumed that, of the low-side switching elements (the FETs 121L, 122L, and 123L) of the first inverter 120, a short-circuit failure has occurred in the FET 121L. Note that, in the event of a short-circuit failure in the FET 122L or 123L, the power conversion device 100 can also be controlled by a control method described below.

In the event of a short-circuit failure in the FET 121L, the control circuit 300 puts the SWs 111, 112, 113, and 114 of the two switch circuits 110 and the FETs 121H, 122H, 123H, 122L, and 123L of the first inverter 120 into the third state as in the event of an open-circuit failure. Note that, in the event of a short-circuit failure, if the SW 111 is turned on, a current flows from the short-circuited FET 121L into the GND. Therefore, the control in the fourth state is forbidden.

Figure 10:
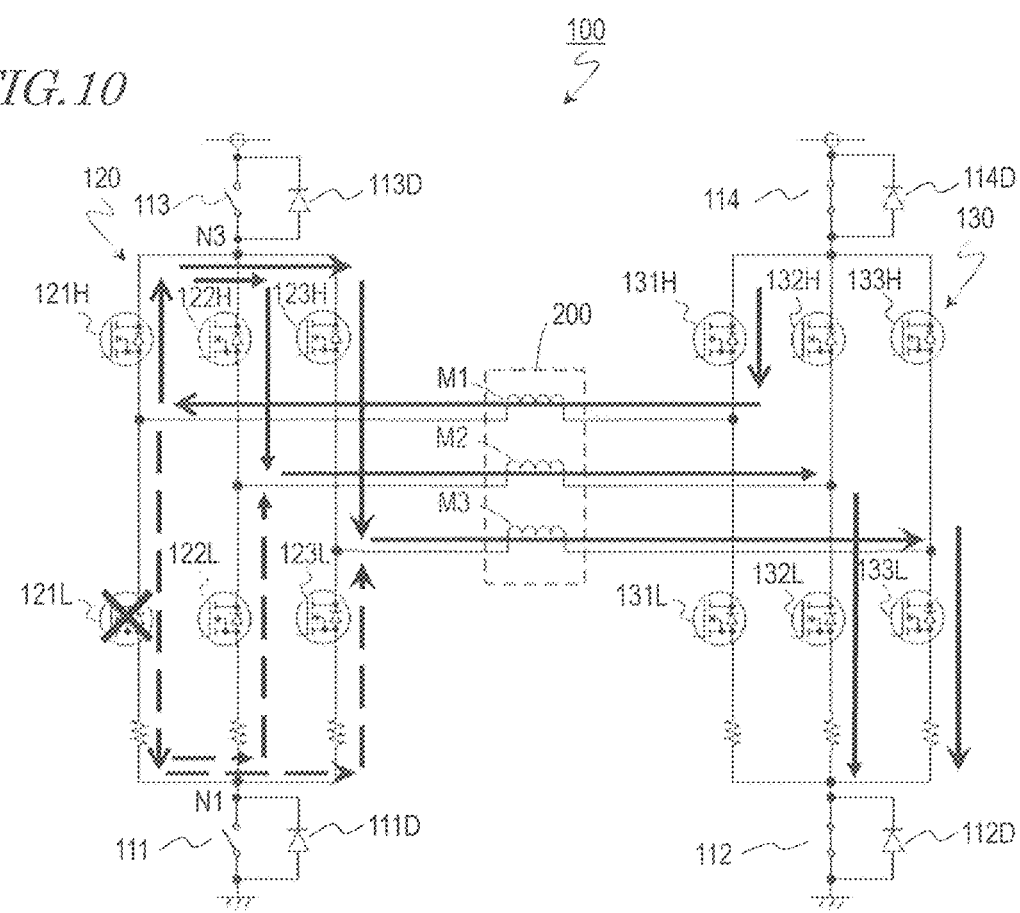
FIG. 10 is a schematic diagram showing flows of currents in the power conversion device 100 that occur when the SWs of the two switch circuits 110 and the FETs of the first inverter 120 are in the third state.

FIG. 10 schematically shows flows of currents in the power conversion device 100 that occur when the SWs of the two switch circuits 110 and the FETs of the first inverter 120 are in the third state. FIG. 10 shows flows of currents at a motor electrical angle of, for example, 270°. The three solid lines represent currents flowing from the power supply 101 to the motor 200, and a long dashed line represents a current flowing through the FET 121L.

In the state shown in FIG. 10, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the SW 112 for the second inverter 130 to the GND. In addition, a freewheeling current flows through the freewheeling diode of the FET 131L in a direction toward the winding M1 of the motor 200. Furthermore, in the event of a short-circuit failure, a current flows from the short-circuited FET 121L to the low-side node N1 unlike the event of an open-circuit failure. A portion of the current flows through the freewheeling diode of the FET 122L to the winding M2, and the remaining current flows through the freewheeling diode of the FET 123L to the winding M3. The currents flowing through the windings M2 and M3 flow through the SW 112 to the GND.

For example, the values of currents flowing through the windings every predetermined motor electrical angle are as shown in Table 2.

The power conversion device 100 drives the motor 200 using the neutral point formed on the high side of the first inverter 120, and the second inverter 130. The control circuit 300 can control the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, the first inverter 120 is not electrically connected to the GND, and therefore, a current does not flow from the first inverter 120 to the GND.

(2-5. Power Supply-Side Switch Element Open-Circuit Failure)

The control under abnormal conditions will be described that is performed in the event of an open-circuit failure in the SW 113 of the power supply-side switch circuit 110.

It is assumed that an open-circuit failure has occurred in the SW 113 of the power supply-side switch circuit 110. In this case, the control circuit 300 puts the SWs 111, 112, and 114 of the two switch circuits 110 and the FETs 121H, 122H, 123H, 121L, 122L, and 123L of the first inverter 120 into a fifth state. In the fifth state, the SW 111 is off and the SWs 112 and 114 are on in the two switch circuits 110. In addition, the FETs 121L, 122L, and 123L are on and the FETs 121H, 122H, and 123H are off in the first inverter 120.

In the fifth state, the first inverter 120 is electrically disconnected from the power supply 101 and the GND, and the second inverter 130 is electrically connected to the power supply 101 and the GND, since the SW 113 is in the open state. In addition, all the three low-side switching elements of the first inverter 120 are on, and therefore, a neutral point for the windings is formed at the low-side node N1.

Figure 11:
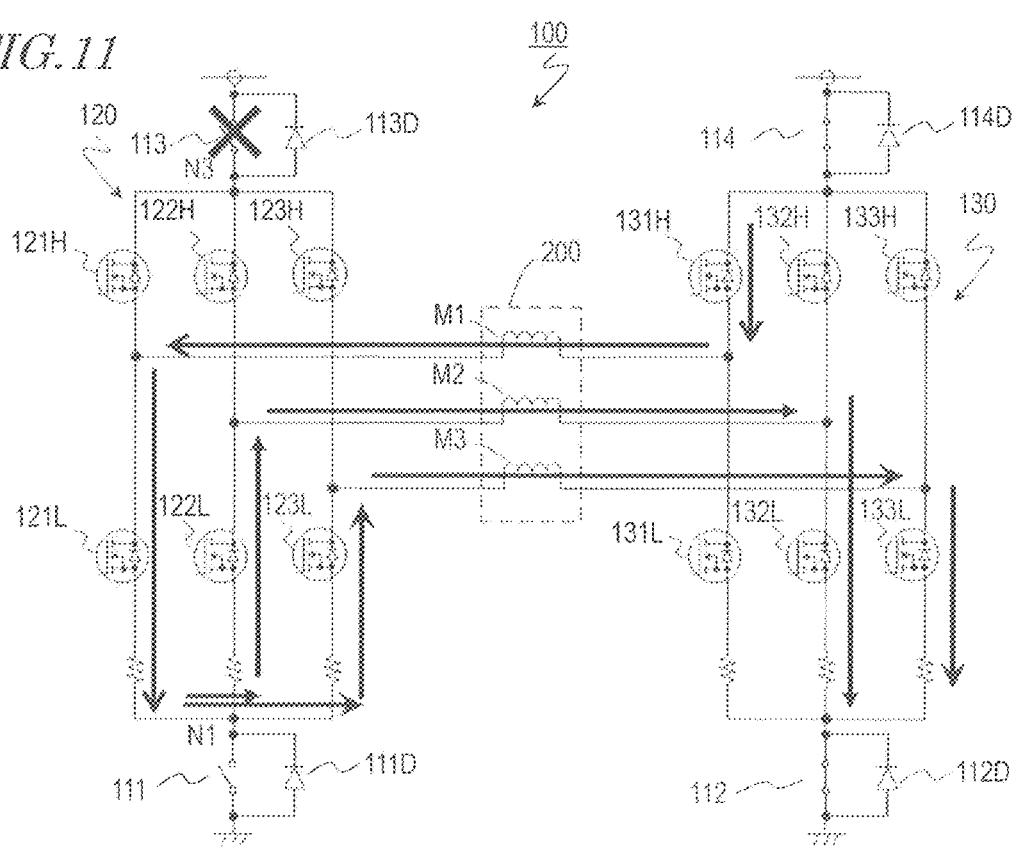
FIG. 11 is a schematic diagram showing flows of currents in the power conversion device 100 that occur when the SWs of the two switch circuits 110 and the FETs of the first inverter 120 are in a fifth state.

FIG. 11 schematically shows flows of currents in the power conversion device 100 that occur when the SWs of the two switch circuits 110 and the FETs of the first inverter 120 are in the fifth state. FIG. 11 shows flows of currents at a motor electrical angle of, for example, 270°. The three solid lines represent currents flowing from the power supply 101 to the motor 200.

In the state shown in FIG. 11, the FETs 131H, 132L, and 133L are on and the FETs 131L, 132H, and 133H are off in the second inverter 130. A current flowing through the FET 131H of the second inverter 130 flows through the winding M1 and the FET 121L of the first inverter 120 to the neutral point. A portion of the current flows through the FET 122L to the winding M2, and the remaining current flows through the FET 123L to the winding M3. The currents flowing through the windings M2 and M3 flow through the SW 112 for the second inverter 130 to the GND. For example, the values of currents flowing through the windings every predetermined motor electrical angle are as shown in Table 2.

The power conversion device 100 drives the motor 200 using the neutral point formed on the low side of the first inverter 120, and the second inverter 130. The control circuit 300 can control the switching operations of the FETs of the bridge circuit R by PWM control such that, for example, the current waveforms of FIG. 8 are obtained. For example, the values of currents flowing through the windings every predetermined motor electrical angle are as shown in Table 2.

In the event of an open-circuit failure in the SW 113, a neutral point may be formed on either the low side or the high side. The control circuit 300 can put the SWs 111, 112, and 114 of the two switch circuits 110 and the FETs 121H, 122H, 123H, 121L, 122L, and 123L of the first inverter 120 into a sixth state. In the sixth state, the SWs 112 and 114 are on in the two switch circuits 110. In addition, the FETs 121L, 122L, and 123L are off and the FETs 121H, 122H, and 123H are on in the first inverter 120. The SW 111 of the GND-side switch circuit 110 may be either on or off.

In the sixth state, the first inverter 120 is electrically disconnected from the power supply 101 and the GND, and the second inverter 130 is electrically connected to the power supply 101 and the GND, since the SW 113 is in the open state. In addition, all the three low-side switching elements of the first inverter 120 are on, and therefore, a neutral point for the windings is formed at the high-side node N3.

Figure 12:
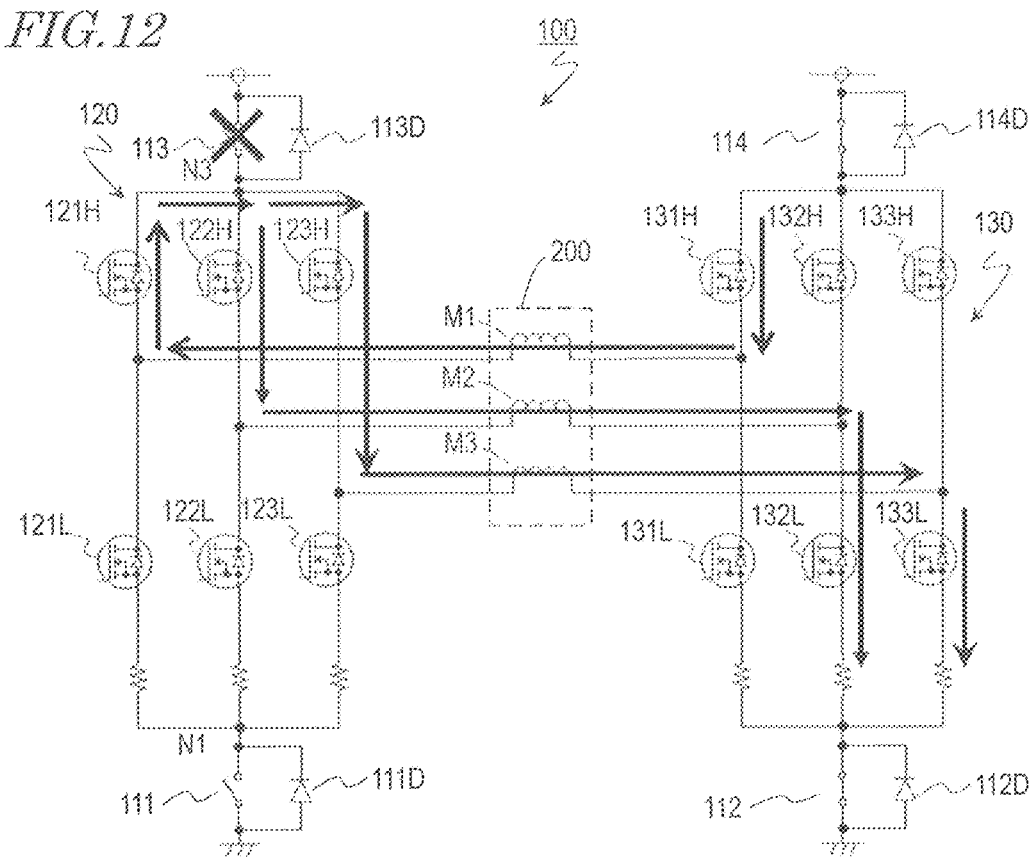
FIG. 12 is a schematic diagram showing flows of currents in the power conversion device 100 that occur when the SWs of the two switch circuits 110 and the FETs of the first inverter 120 are in a sixth state.

FIG. 12 schematically shows flows of currents in the power conversion device 100 that occur when the SWs of the two switch circuits 110 and the FETs of the first inverter 120 are in the sixth state. FIG. 12 shows flows of currents at a motor electrical angle of, for example, 270°. The three solid lines represent currents flowing from the power supply 101 to the motor 200.

The power conversion device 100 drives the motor 200 using the neutral point formed on the high side of the first inverter 120, and the second inverter 130. The control circuit 300 can control the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, irrespective of whether the SW 111 is on or off, all the low-side switching elements are off, and therefore, a current does not flow from the first inverter 120 to the GND.

In the event of an open-circuit failure in the SW 113, the state of the SWs of the two switch circuits 110 and the FETs of the first inverter 120 is not limited to the fifth or sixth state. For example, the control circuit 300 may put these SWs and FETs into a seventh state. In the seventh state, the SW 111 is off and the SWs 112 and 114 are on in the two switch circuits 110. In addition, the FETs 121L, 122L, and 123L are on and at least one of the FETs 121H, 122H, and 123H is on in the first inverter 120. The seventh state is different from the fifth state in that at least one of the high-side switching elements is on.

For example, when one FET of the three high-side switching elements is on, a current does not flow through that FET due to the freewheeling diodes of the other two FETs at certain motor electrical angles. For example, in the fifth state of the FETs shown in FIG. 11, when the motor electrical angle is 270°, then if the FET 121H is on and the other FETs 122H and 123H are off, a current does not flow on the high side. When the motor electrical angle is 180°-360° in Table 2, a current does not flow on the high side. Meanwhile, in the fifth state of the FETs shown in FIG. 11, when the motor electrical angle is 0°-120° in Table 2, then if the FET 121H is on and the other FETs 122H and 123H are off, a freewheeling current flows through the freewheeling diode of the FET 122H to the FET 121H. When the motor electrical angle is 60°-180° in Table 2, a freewheeling current flows through the freewheeling diode of the FET 123H to the FET 121H. Note that because an open-circuit failure has occurred in the SW 113, a current does not flow from the power supply 101 to the high-side node N3. Thus, if at least one of the high-side switching elements is turned on, a current may be shunted, i.e., currents may flow in a more distributed manner, when the motor electrical angle is within a certain range, resulting in a reduction in heat influence.

If all the high-side switching elements are turned on, two neutral points are formed on the low and high sides. Note that because an open-circuit failure has occurred in the SW 113, a current does not flow from the power supply 101 to the neutral point on the high-side node. A current may be shunted using the two neutral points, i.e., currents may flow in a more distributed manner, resulting in a reduction in heat influence on the inverter.

(2-6. Power Supply-Side Switch Element Short-Circuit Failure)

The control under abnormal conditions will be described that is performed in the event of a short-circuit failure in the SW 113 of the power supply-side switch circuit 110.

It is assumed that a short-circuit failure has occurred in the SW 113 of the power supply-side switch circuit 110. In this case, the control circuit 300 puts the SWs 111, 112, and 114 of the two switch circuits 110 and the FETs 121H, 122H, 123H, 121L, 122L, and 123L of the first inverter 120 into the fifth state. Note that if at least one of the high-side switching elements is turned on, a current flows through the SW 113 to the on-state high-side switching element. Therefore, the control in the seventh state is forbidden.

As in the event of an open-circuit failure, all the three low-side switching elements are turned on so that a neutral point for the windings is formed at the low-side node N1. The power conversion device 100 drives the motor 200 using the neutral point formed on the low side of the first inverter 120, and the second inverter 130. The control circuit 300 can control the switching operations of the FETs of the bridge circuit R by PWM control such that, for example, the current waveforms of FIG. 8 are obtained. For example, in the fifth state in the event of a short-circuit failure, the flows of currents in the power conversion device 100 at an electrical angle of 270° are as shown in FIG. 11. The values of currents flowing through the windings every predetermined motor electrical angle are as shown in Table 2.

In this control, all the high-side switching elements are off, and therefore, a current does not flow from the power supply 101 into the first inverter 120, irrespective of the occurrence of a short circuit in the SW 113. In addition, the first inverter 120 is not electrically connected to the GND, and therefore a current flowing the neutral point does not flow to the GND.

(2-7. GND-Side Switch Element Open-Circuit Failure)

The control under abnormal conditions will be described that is performed in the event of an open-circuit failure in the SW 111 of the GND-side switch circuit 110.

It is assumed that an open-circuit failure has occurred in the SW 111 of the GND-side switch circuit 110. In this case, the control circuit 300 puts the SWs 112, 113, and 114 of the two switch circuits 110 and the FETs 121H, 122H, 123H, 121L, 122L, and 123L of the first inverter 120 into an eighth state. In the eighth state, the SW 113 is off and the SWs 112 and 114 are on in the two switch circuits 110. In addition, the FETs 121L, 122L, and 123L are off and the FETs 121H, 122H, and 123H are on in the first inverter 120.

In the eighth state, the first inverter 120 is electrically disconnected from the power supply 101 and the GND, and the second inverter 130 is electrically connected to the power supply 101 and the GND, since the SW 111 is in the open state. In addition, all the three high-side switching elements of the first inverter 120 are on, and therefore, a neutral point for the windings is formed at the high-side node N3.

Figure 13:
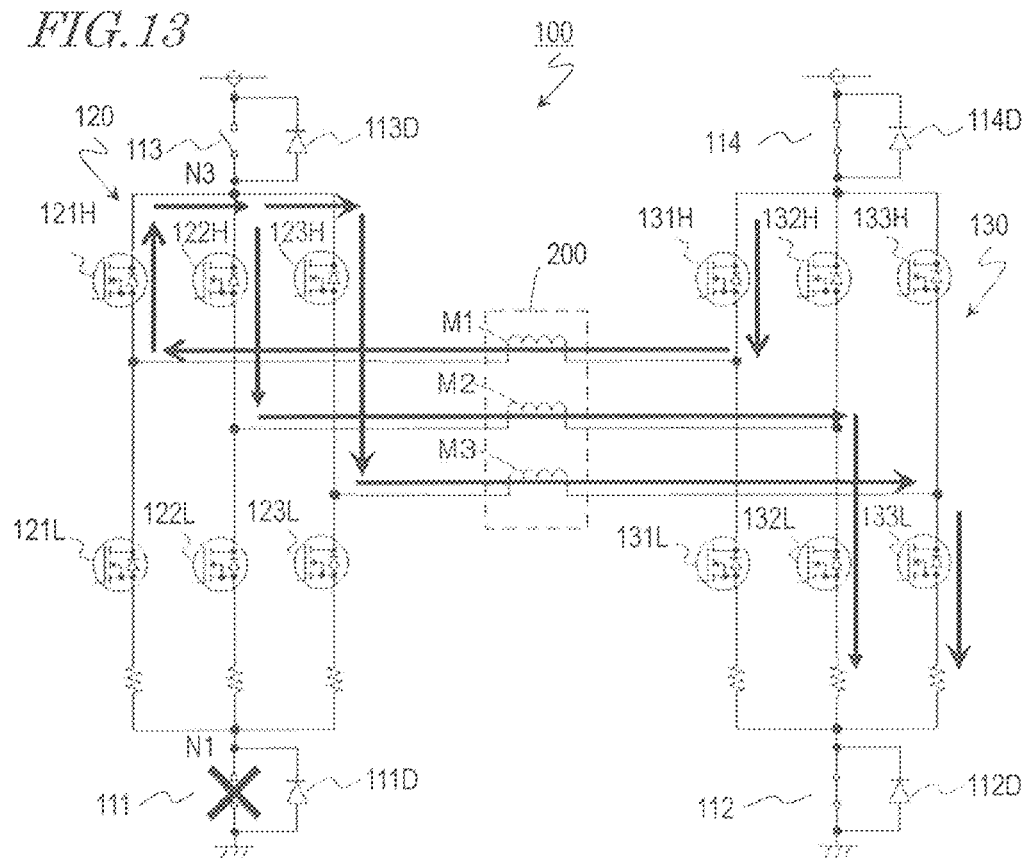
FIG. 13 is a schematic diagram showing flows of currents in the power conversion device 100 that occur when the SWs of the two switch circuits 110 and the FETs of the first inverter 120 are in an eighth state.

FIG. 13 schematically shows flows of currents in the power conversion device 100 that occur when the SWs of the two switch circuits 110 and the FETs of the first inverter 120 are in the eighth state. FIG. 13 shows flows of currents at a motor electrical angle of, for example, 270°. The three solid lines represent currents flowing from the power supply 101 to the motor 200, and a dashed line represents a freewheeling current that flows back to the winding M1 of the motor 200.

In the state shown in FIG. 13, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the SW 112 for the second inverter 130 to the GND. In addition, a freewheeling current flows through the freewheeling diode of the FET 131L in a direction toward the winding M1 of the motor 200.

The power conversion device 100 drives the motor 200 using the neutral point formed on the high side of the first inverter 120, and the second inverter 130. The control circuit 300 can control the switching operations of the FETs of the bridge circuit R by PWM control such that, for example, the current waveforms of FIG. 8 are obtained. For example, the values of currents flowing through the windings every predetermined motor electrical angle are as shown in Table 2.

In this control, the power supply 101 is not electrically connected to the first inverter 120, and therefore, a current does not flow from the power supply 101 into the neutral point of the first inverter 120. In addition, the failed SW 111 is in the open state, and therefore, a current does not flow from the first inverter 120 to the GND.

In the event of an open-circuit failure in the SW 111, the state of the SWs of the two switch circuits 110 and the FETs of the first inverter 120 is not limited to the eighth state. For example, the control circuit 300 may put these SWs and FETs into a ninth state. In the ninth state, the SW 113 is off and the SWs 112 and 114 are on in the two switch circuits 110. In addition, at least one of the FETs 121L, 122L, and 123L is on and the FETs 121H, 122H, and 123H are on in the first inverter 120. The ninth state is different from the eighth state in that at least one of the low-side switching elements is on.

For example, when one FET of the three low-side switching elements is on, a current does not flow through that FET due to the freewheeling diodes of the other two FETs at certain motor electrical angles. For example, in the eighth state of the FETs shown in FIG. 13, when the motor electrical angle is 270°, then if the FET 121L is on and the other FETs 122L and 123L are off, a freewheeling current flows through the FET 121L to the freewheeling diodes of the FETs 122L and 123L. When the motor electrical angle is 180°-360° in Table 2, a current flows on the low side. Note that because an open-circuit failure has occurred in the SW 111, a current does not flow from the neutral point on the low side to the GND. Thus, if at least one of the low-side switching elements is on, a current may be shunted, i.e., currents may flow in a more distributed manner, when the motor electrical angle is within a certain range, resulting in a reduction in heat influence.

If all the low-side switching elements are turned on, two neutral points are formed on the low and high sides. Note that because an open-circuit failure has occurred in the SW 111, a current does not flow the neutral point on the low side to the GND. A current may be shunted using the two neutral points, i.e., currents may flow in a more distributed manner, resulting in a reduction in heat influence on the inverter.

(2-8. GND-Side Switch Element Short-Circuit Failure)

The control under abnormal conditions will be described that is performed in the event of a short-circuit failure in the SW 111 of the GND-side switch circuit 110.

It is assumed that a short-circuit failure has occurred in the SW 111 of the GND-side switch circuit 110. In this case, the control circuit 300 puts the SWs 112, 113, and 114 of the two switch circuits 110 and the FETs 121H, 122H, 123H, 121L, 122L, and 123L of the first inverter 120 into the eighth state. Note that if at least one of the low-side switching elements is turned on, a current flows through the SW 111 to the GND. Therefore, the control in the ninth state is forbidden.

As in the event of an open-circuit failure, all the three high-side switching elements are turned on so that a neutral point for the windings is formed at the high-side node N3. The power conversion device 100 drives the motor 200 using the neutral point formed on the high side of the first inverter 120, and the second inverter 130. The control circuit 300 can control the switching operations of the FETs of the bridge circuit R by PWM control such that, for example, the current waveforms of FIG. 8 are obtained. For example, in the eighth state in the event of a short-circuit failure, the flows of currents in the power conversion device 100 at an electrical angle of 270° are as shown in FIG. 13. The values of currents flowing through the windings every predetermined motor electrical angle are as shown in Table 2.

In this control, a current does not flow from the power supply 101 into the neutral point of the first inverter 120. In addition, all the low-side switching elements are turned off, and therefore, a current does not flow from the first inverter 120 to the GND, irrespective of the occurrence of a short circuit in the SW 111.

According to this embodiment, in the control under abnormal conditions, a power loss can be prevented or reduced, and a closed loop of a drive current can be formed to achieve suitable current control. In addition, the protection circuit can prevent or reduce a breakage of an SW or a FET due to a zero-phase current.

In the present disclosure, the control under normal conditions is not limited to the above three-phase conduction control for separately controlling currents flowing through three phase windings. As in Japanese Laid-Open Patent Publication No. 2014-192950, the control may be conduction control for driving a motor using one of two inverters with a neutral point being formed in the other inverter. For example, the control circuit 300 can switch between the two controls according to the rotational speed of the motor 200. According to the present disclosure, a zero-phase current that may occur during this switching can be effectively reduced. In particular, if the conduction controls are switched as appropriate, the control performance may be improved, and losses such as a copper loss and a power loss in a FET may be reduced.

The on/off-states of switching elements that form a neutral point in an inverter are not limited to the above first to ninth states. Some example sets of on/off-states of switching elements that form a neutral point in an inverter will now be described.

Figure 14A:
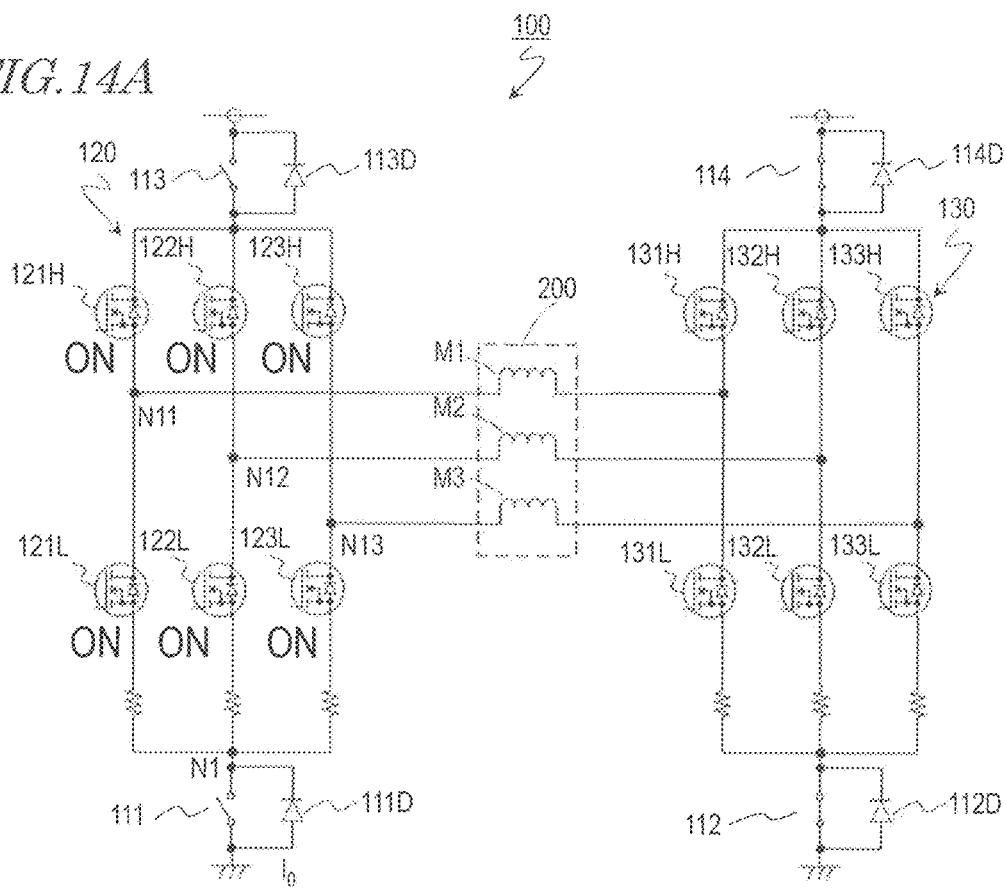
FIG. 14A is a schematic diagram showing another set of on/off-states of switching elements that forms a neutral point in the first inverter 120.
Figure 14B:
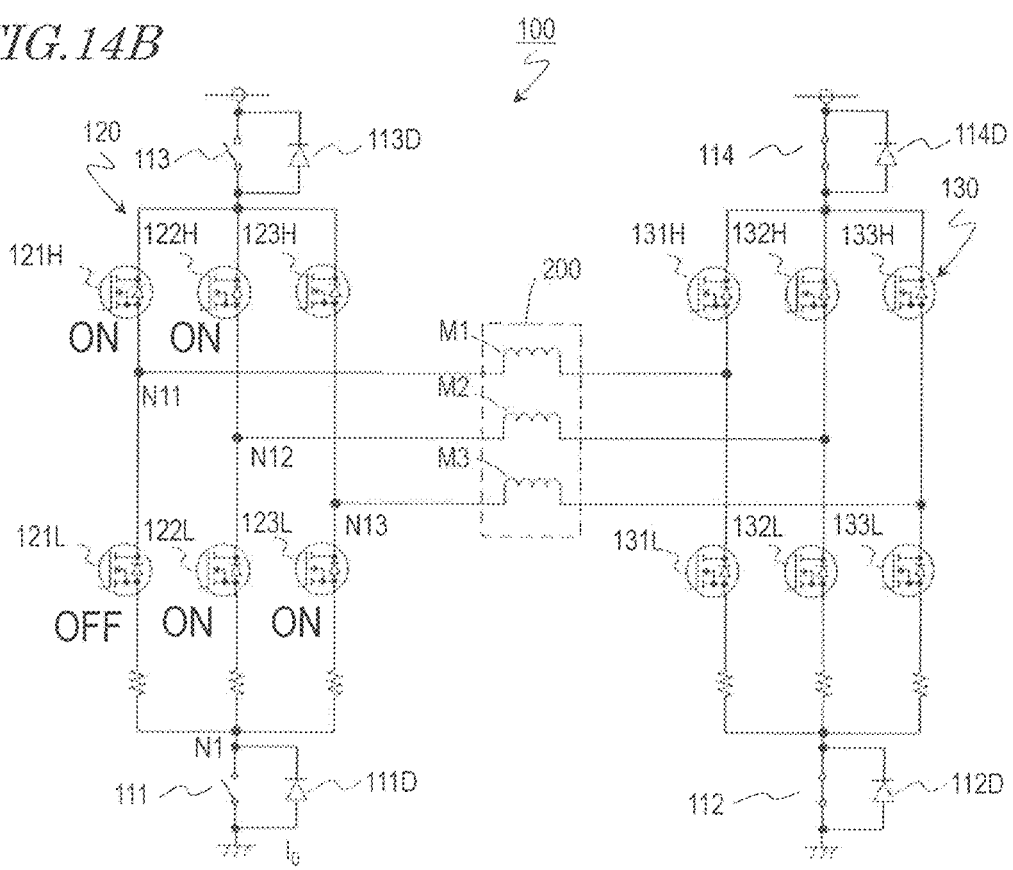
FIG. 14B is a schematic diagram showing another set of on/off-states of switching elements that forms a neutral point in the first inverter 120.
Figure 14C:
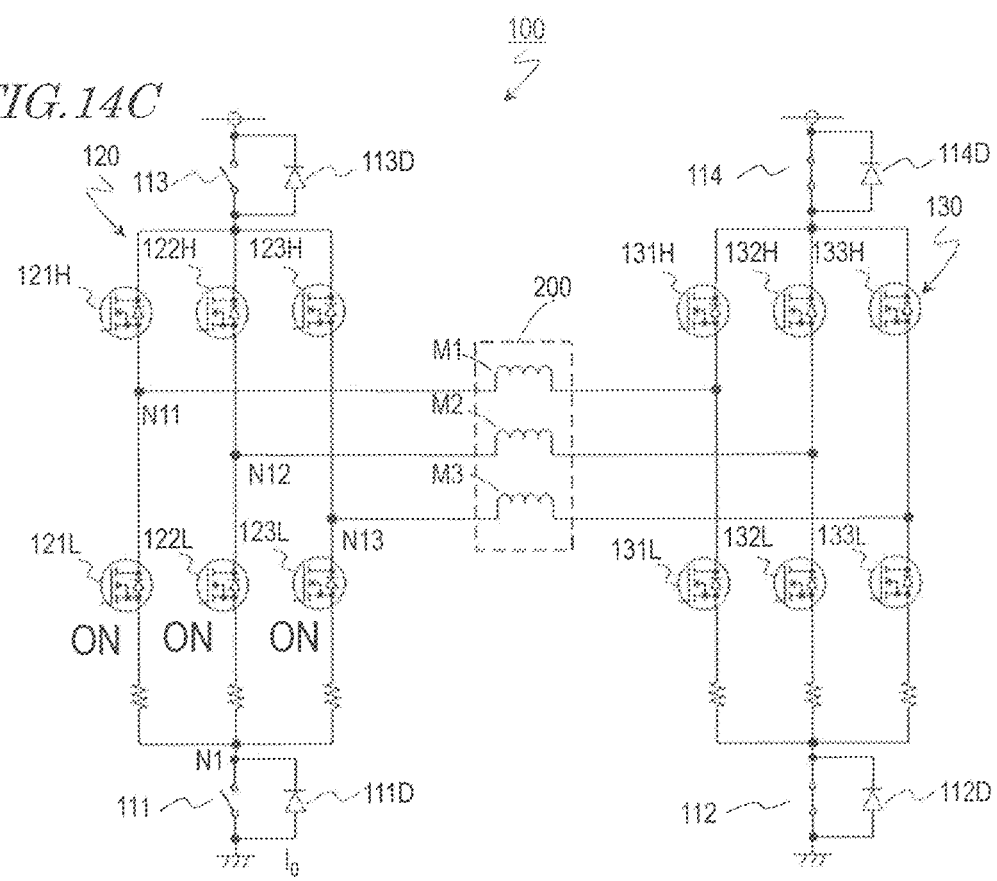
FIG. 14C is a schematic diagram showing another set of on/off-states of switching elements that forms a neutral point in the first inverter 120.

FIGS. 14A-14C show other sets of on/off-states of switching elements that form a neutral point in the first inverter 120.

The formation of a neutral point means that three nodes N11, N12, and N13 at which the legs of the bridge circuit of the inverter 120 are coupled to the respective phase windings are caused to have equal potentials. As shown in FIG. 14A, the three nodes N11, N12, and N13 can be caused to have equal potentials by turning on all the switching elements in the first inverter 120. As a result, a neutral point is formed in the first inverter 120.

In the conduction state in the control under normal conditions, the motor 200 can be driven by turning on and off the switching elements of the second inverter 130 with a neutral point being formed in the first inverter 120 by the above technique. In addition, for example, in the event of a short-circuit failure in the FET 121H of the first inverter 120, the motor 200 can be driven using the same technique as under normal conditions.

As shown in FIG. 14B, in the bridge circuit of the first inverter 120, the three nodes N11, N12, and N13 can be caused to have equal potentials by turning on the FETs 121H, 122H, 122L, and 123L and turning off the FET 121L. The FET 123H is either on or off. For example, this pattern is applicable when the first inverter 120 is operating normally, or when an open or short-circuit failure has occurred in the FET 123H.

As shown in FIG. 14C, the three nodes N11, N12, and N13 can be caused to have equal potentials by turning on the FETs 121L, 122L, and 123L in the bridge circuit of the first inverter 120. The FETs 121H, 122H, and 123H are each either on or off. For example, this pattern is applicable when the first inverter 120 is operating normally, or when an open or short-circuit failure has occurred in the FET 123H.

Variations of the circuit configuration of the power conversion device 100 will be described with reference to FIGS. 15A-15D.

In this embodiment, the two switch circuits 110 of the power conversion device include the SWs 111, 112, 113, and 114. However, the present disclosure is not limited to this. The two switch circuits 110 may include at least one of the SWs 111, 112, 113, and 114. For example, the two switch circuits 110 can include the SWs 111 and 113 of the SWs 111, 112, 113, and 114.

Figure 15A:
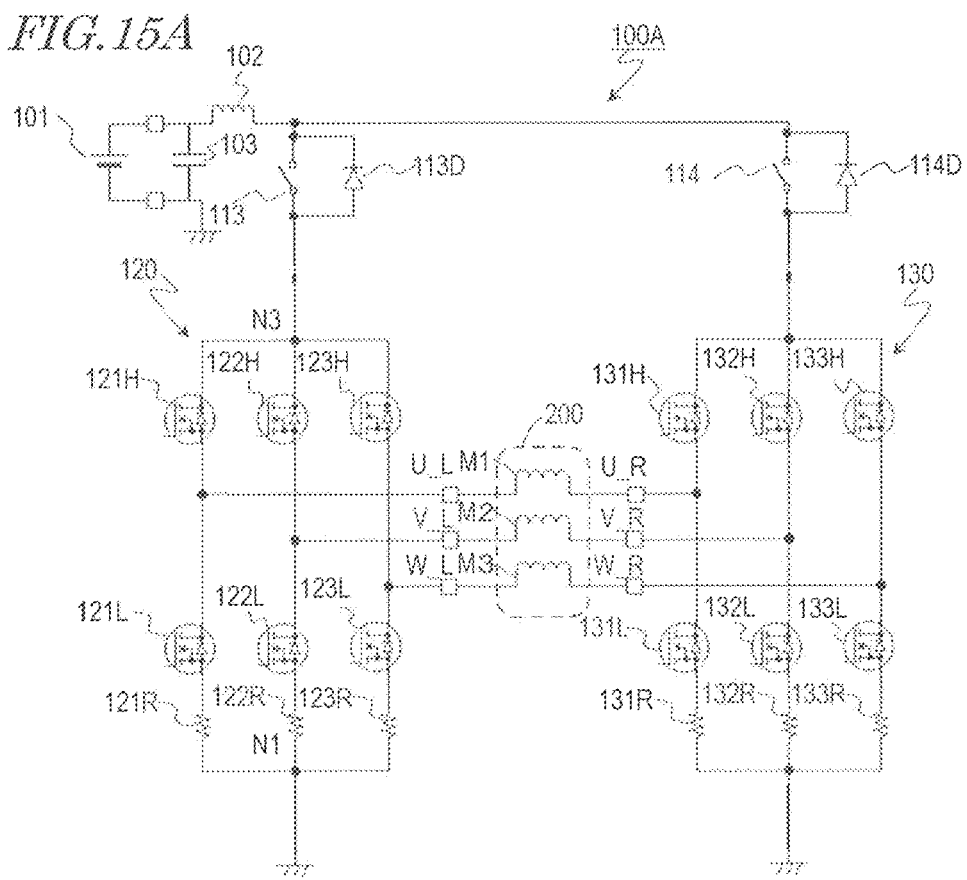
FIG. 15A is a circuit diagram showing a circuit configuration of a power conversion device 100A that includes one of the two switch circuits 110 that is a power supply-side switch circuit including SWs 113 and 114.

FIG. 15A shows a circuit configuration of a power conversion device 100A that includes the power supply-side switch circuit including the SWs 113 and 114 of the two switch circuits 110. In this variation, for example, in the event of a short-circuit failure in the FET 121H, if the SW 113 is turned off, a current can be prevented from flowing from the power supply 101 to the FET 121H. In other words, when the first inverter 120 is not operating normally, the SW 113 breaks the connection between the power supply 101 and the first inverter 120. In addition, the FETs 121L, 122L, and 123L are turned off and the FETs 122H and 123H are turned on so that a neutral point is formed at the high-side node N3.

Figure 15B:
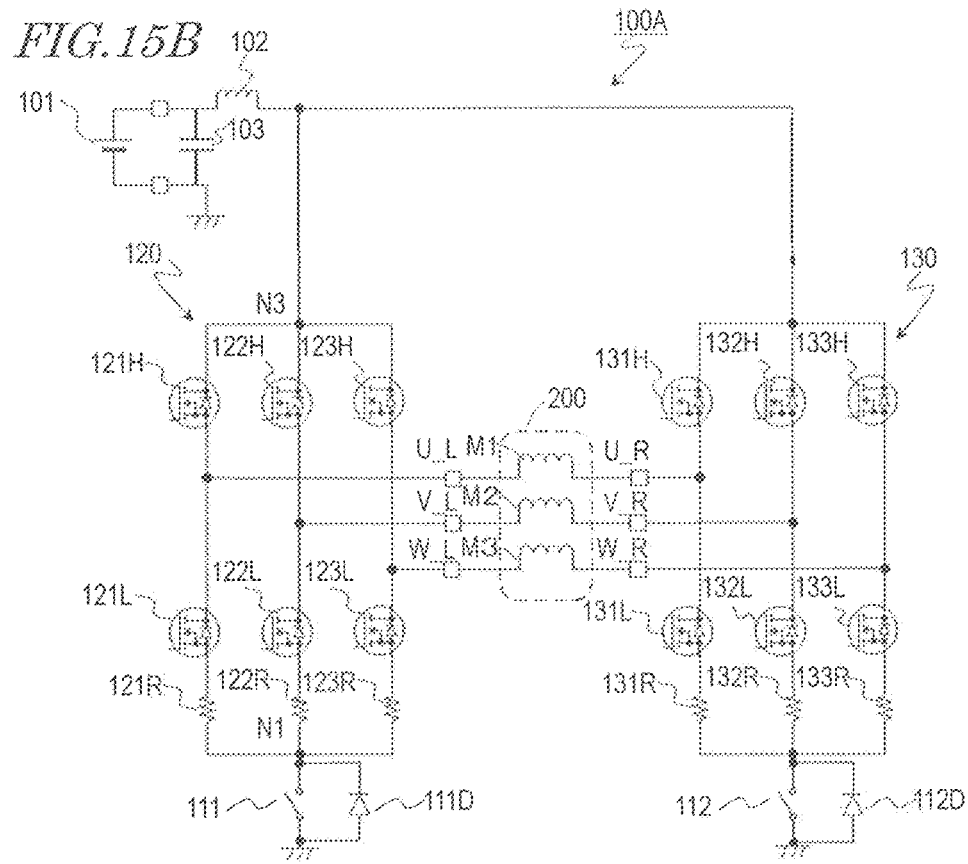
FIG. 15B is a circuit diagram showing a circuit configuration of a power conversion device 100A that includes one of the two switch circuits 110 that is a GND-side switch circuit including SWs 111 and 112.

FIG. 15B shows a circuit configuration of a power conversion device 100A that includes the GND-side switch circuit including the SWs 111 and 112 of the two switch circuits 110. In this variation, for example, in the event of a short-circuit failure in the FET 121L, if the SW 111 is turned off, a current can be prevented from flowing through the FET 121L to the GND. In other words, when the first inverter 120 is not operating normally, the SW 111 breaks the connection between the first inverter 120 and the GND. In addition, the FETs 121H, 122H, and 123H are turned off and the FETs 122L and 123L are turned on so that a neutral point is formed at the low-side node N1.

Figure 15C:
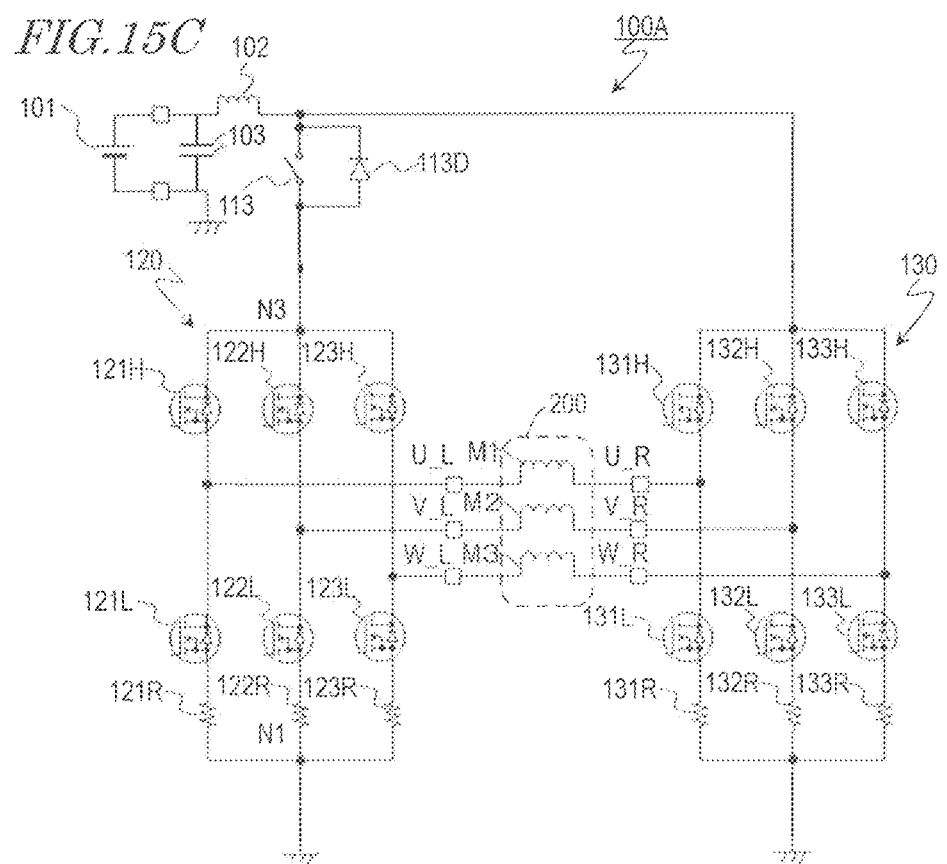
FIG. 15C is a circuit diagram showing a circuit configuration of a power conversion device 100A that includes a switch circuit 110 including one of the switch elements that is the SW 113.

FIG. 15C shows a circuit configuration of a power conversion device 100A that includes a switch circuit 110 including only the SW 113 of the above switch elements. In this variation, for example, in the event of a short-circuit failure in the FET 121H, if the SW 113 is turned off, a current can be prevented from flowing from the power supply 101 to the FET 121H. In addition, the FETs 121L, 122L, and 123L are turned off and the FETs 122H and 123H are turned on so that a neutral point is formed at the high-side node N3.

Figure 15D:
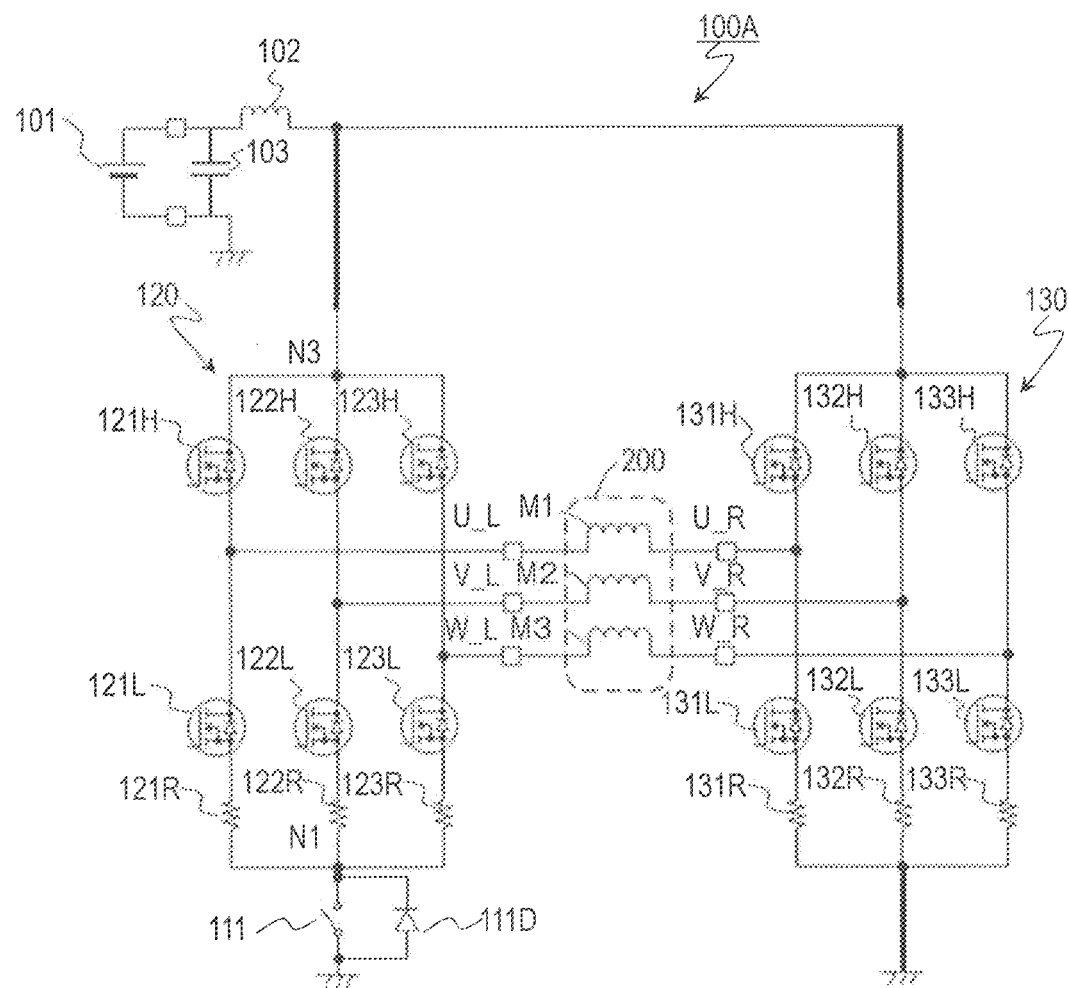
FIG. 15D is a circuit diagram showing a circuit configuration of a power conversion device 100A that includes a switch circuit 110 including one of the switch elements that is the SW 111.

FIG. 15D shows a circuit configuration of a power conversion device 100A that includes a switch circuit 110 including only the SW 111 of the above switch elements. In this variation, for example, in the event of a short-circuit failure in the FET 121L, if the SW 111 is turned off, a current can be prevented from flowing from the FET 121L to the GND. In addition, the FETs 121H, 122H, and 123H are turned off and the FETs 122L and 123L are turned on so that a neutral point is formed at the low-side node N1.

Note that the two switch circuits 110 may have only either the SW 112 or the SW 114 of the above switch elements. Alternatively, the two switch circuits 110 may include any combination of the above switch elements, i.e., one or more selected from the SWs 111, 112, 113, and 114.

Second Embodiment

The protection circuit of the present disclosure may have a resistance element, an RC circuit including a resistance element and a capacitor, or a combination thereof, instead of a diode. Alternatively, the protection circuit may be a snubber circuit having a resistance element, a capacitor, and a diode, etc. These can be used to prevent or reduce an overvoltage in a switching element and thereby protect the switching element, and in addition, cause a zero-phase current to flow out of an inverter circuit, whereby a breakage of an electronic component can be prevented or reduced. Several variations of the protection circuit will now be mainly described.

Figure 16A:
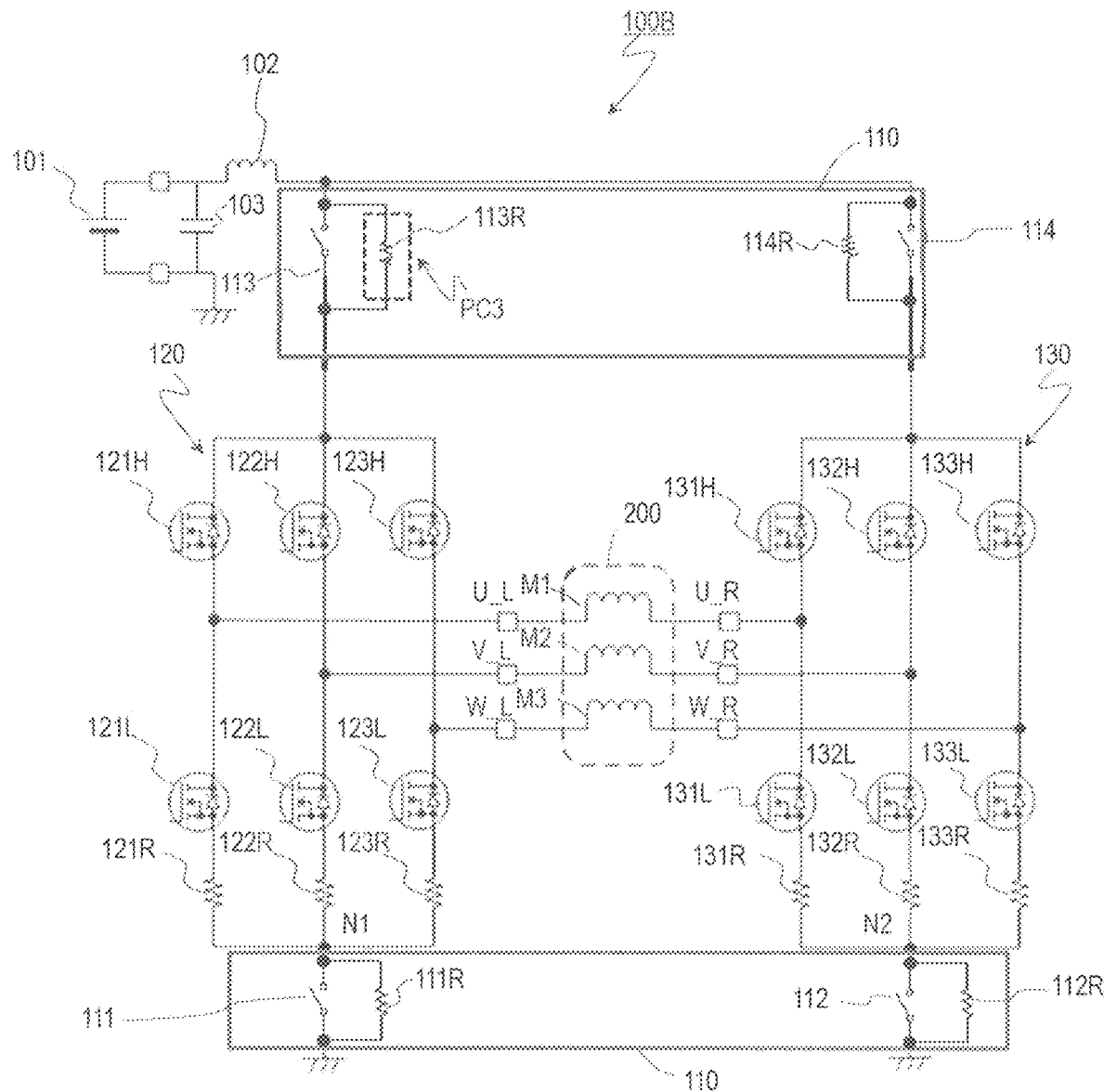
FIG. 16A is a circuit diagram showing a circuit configuration of a power conversion device 100B according to an illustrative second embodiment that includes a resistance element as a protection circuit.
Figure 16B:
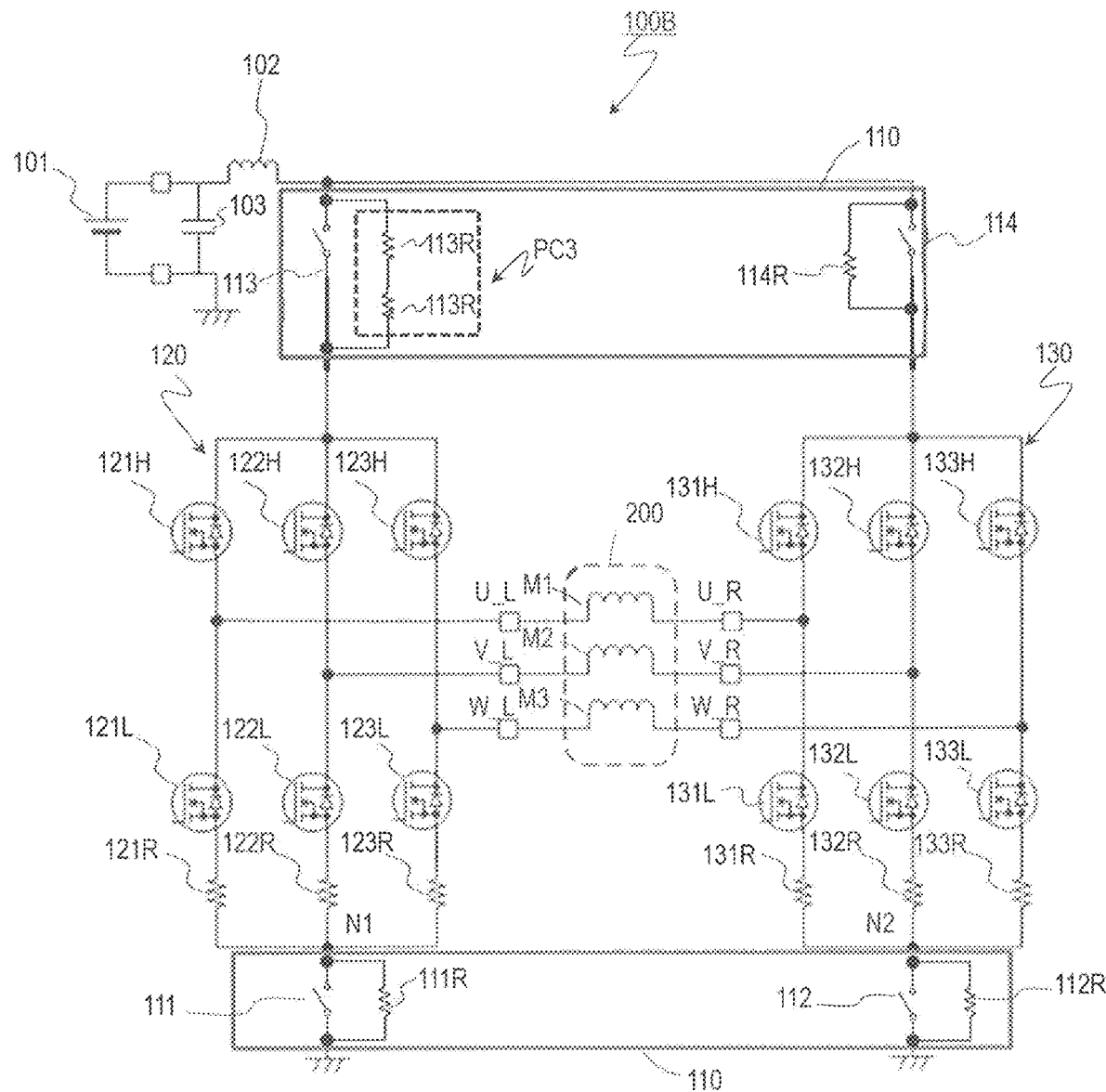
FIG. 16B is a circuit diagram showing a circuit configuration of a power conversion device 100B according to the illustrative second embodiment that includes a resistance element as a protection circuit.
Figure 16C:
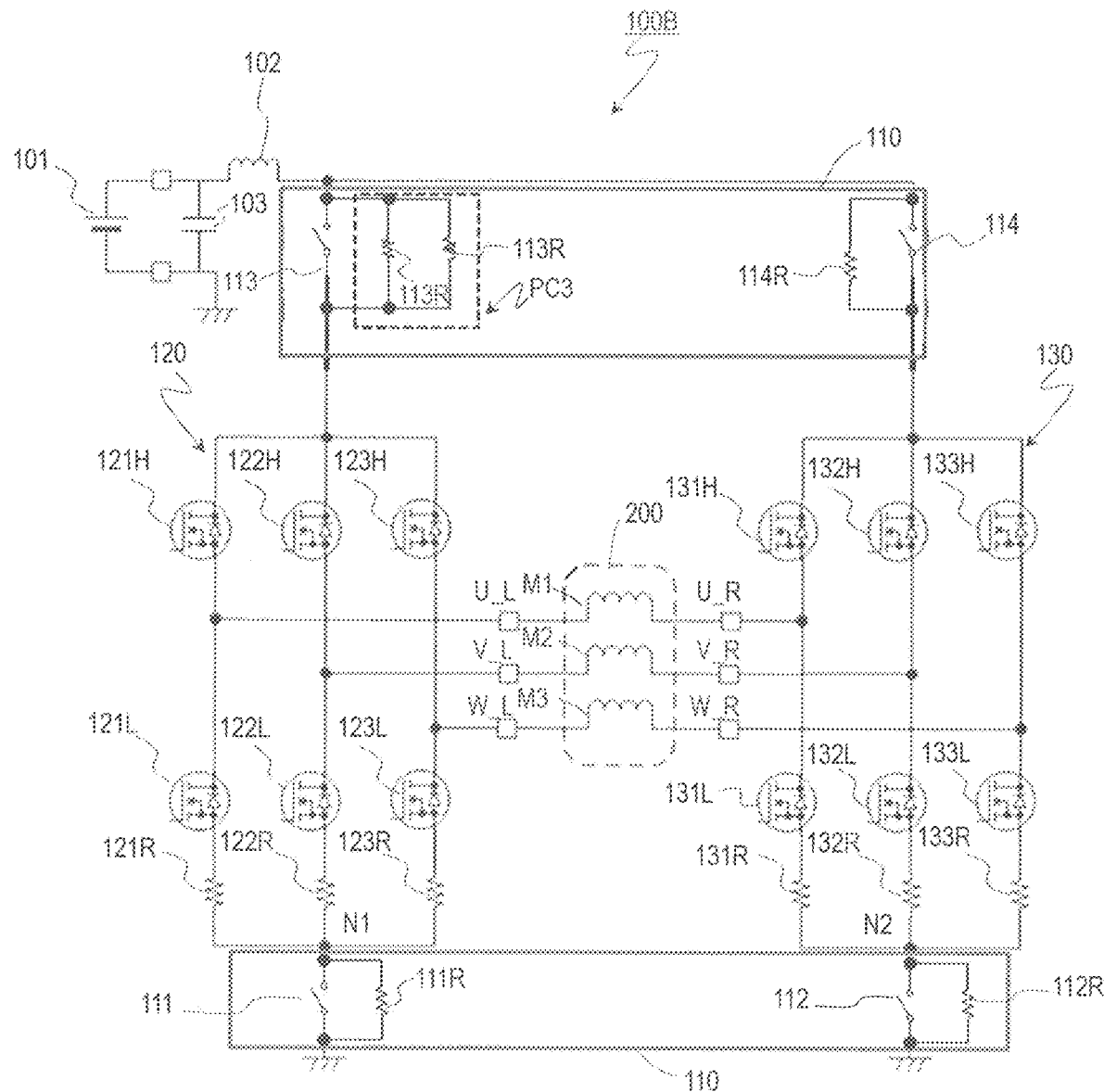
FIG. 16C is a circuit diagram showing a circuit configuration of a power conversion device 100B according to the illustrative second embodiment that includes a resistance element as a protection circuit.

FIGS. 16A-16C schematically show circuit configurations of a power conversion device 100B including a resistance element as a protection circuit.

As shown in FIG. 16A, the protection circuits PC1, PC2, PC3, and PC4 may be resistance elements 111R, 112R, 113R, and 114R. The resistance values of the resistance elements are, for example, about 40 kΩ, which is sufficiently greater than the values of the on-resistances of the SWs. In the control under normal conditions, the SWs 111, 112, 113, and 114 in the two switch circuits 110 are on. In this case, a weak current may flow through each of the resistance elements 111R, 112R, 113R, and 114R, that depends on the ratio of that resistant element and the on-resistance of the corresponding SW. It is considered that power losses in the resistance elements 111R, 112R, 113R, and 114R are considerably low. If a resistance element having a greater resistance value is selected, a power loss caused by a current flowing through a resistance element under normal conditions can be prevented or reduced. In addition, if a resistance element is selected as a protection circuit, the protection circuit can be implemented at relatively low cost, as with a diode.

The protection circuit of the present disclosure can include a plurality of resistance elements coupled together in series or in parallel. The number of resistance elements is not limited to two, and may be three or more. For example, as shown in FIG. 16B, the protection circuit PC3 can include two resistance elements coupled together in series. For example, as shown in FIG. 16C, the protection circuit PC3 can include two resistance elements 113R coupled together in parallel. The protection circuits PC1, PC2, and PC4 can also each include two resistance elements coupled together in series or in parallel, as with the protection circuit PC3. In the present disclosure, at least one of the four protection circuits PC1, PC2, PC3, and PC4 may include a plurality of resistance elements coupled together in series or in parallel.

Figure 17:
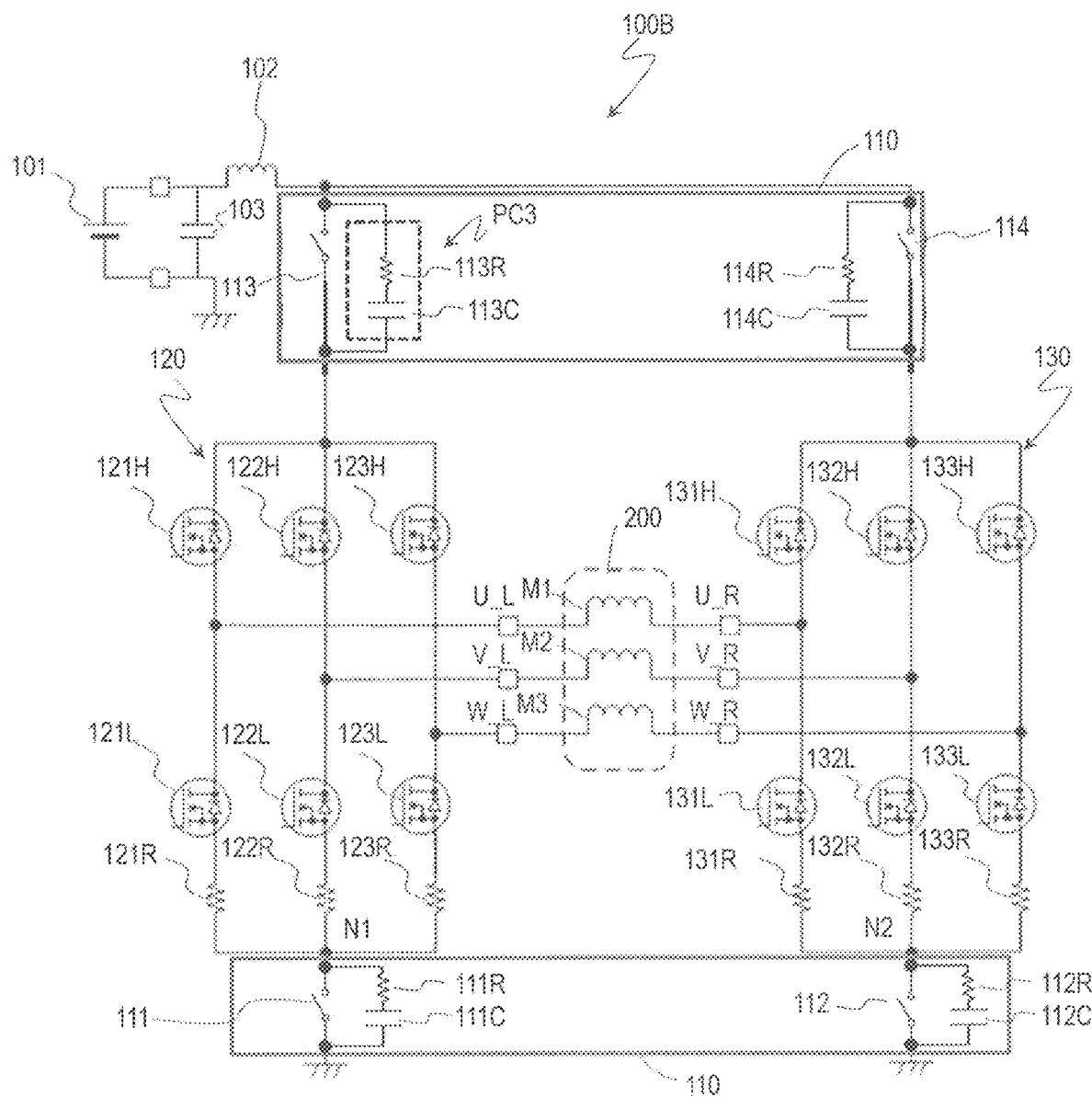
FIG. 17 is a circuit diagram showing a circuit configuration of a power conversion device 100B according to the illustrative second embodiment that includes an RC circuit as a protection circuit.

FIG. 17 schematically shows a circuit configuration of a power conversion device 100B including an RC circuit as a protection circuit.

The protection circuit of the present disclosure can include an RC circuit. FIG. 17 shows an example circuit configuration in which four protection circuits PC1, PC2, PC3, and PC4 include an RC circuit. Note that at least one of the four protection circuits PC1, PC2, PC3, and PC4 may include an RC circuit. The capacitance of the capacitor is determined, as appropriate, according to the magnitude of a zero-phase current flowing through the protection circuit. The protection circuit may be an RC snubber circuit, or an RCD snubber circuit further including a diode, for example.

If an RC circuit is used as the protection circuit, spike-like high voltage noise that would occur when an SW is turned off can be effectively prevented or reduced. The RC circuit can also effectively prevent or reduce harmonic current components (current components other than the fundamental wave) that would occur when each FET is turned on or off. Furthermore, a breakage of an SW itself, or a breakage of electronic components around the SW, can be prevented or reduced, and the influence of electromagnetic noise on electronic components can be minimized.

Figure 18A:
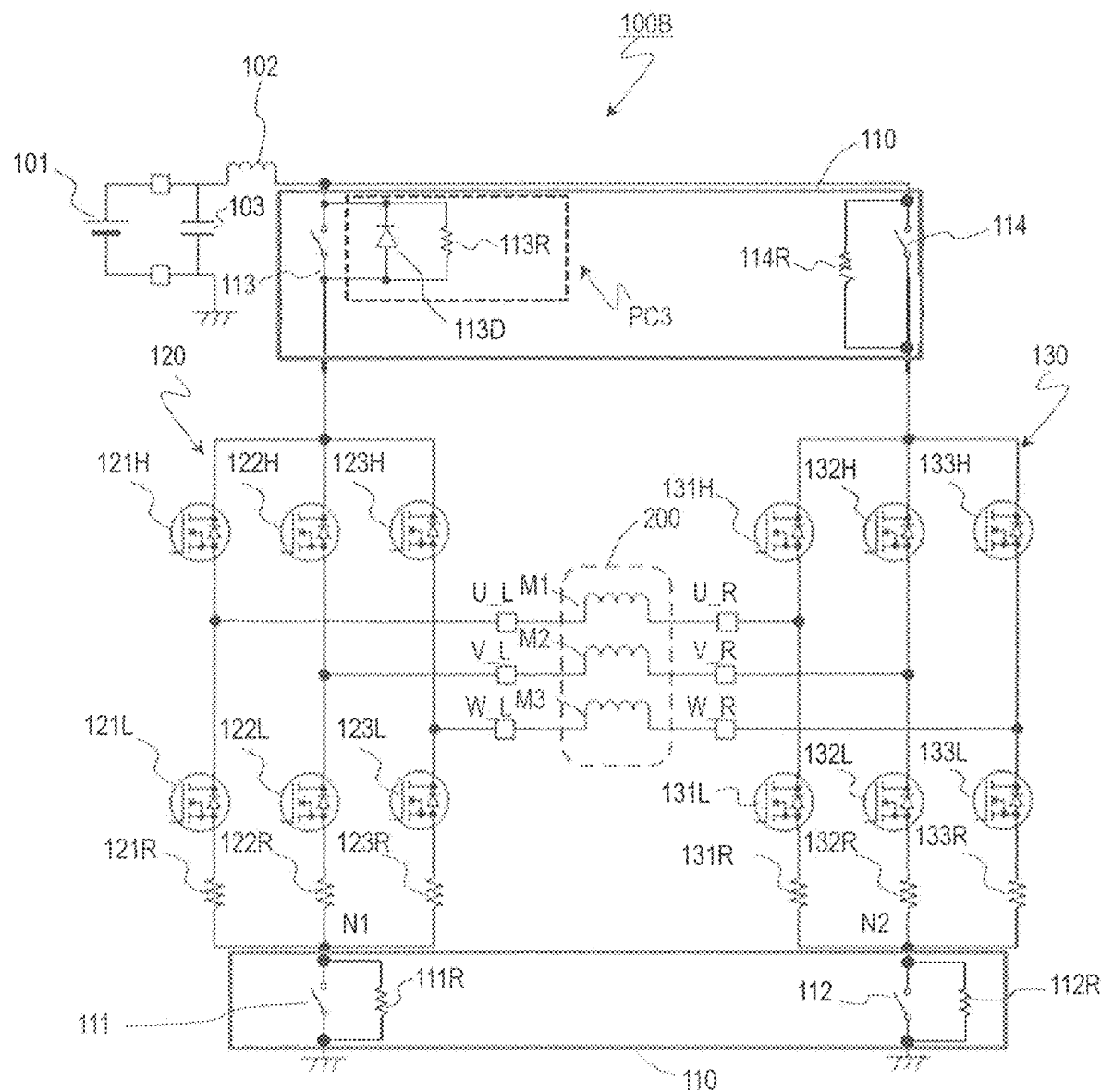
FIG. 18A is a circuit diagram showing a circuit configuration of a power conversion device 100B according to the illustrative second embodiment that includes a diode and a resistance element as protection circuits.
Figure 18B:
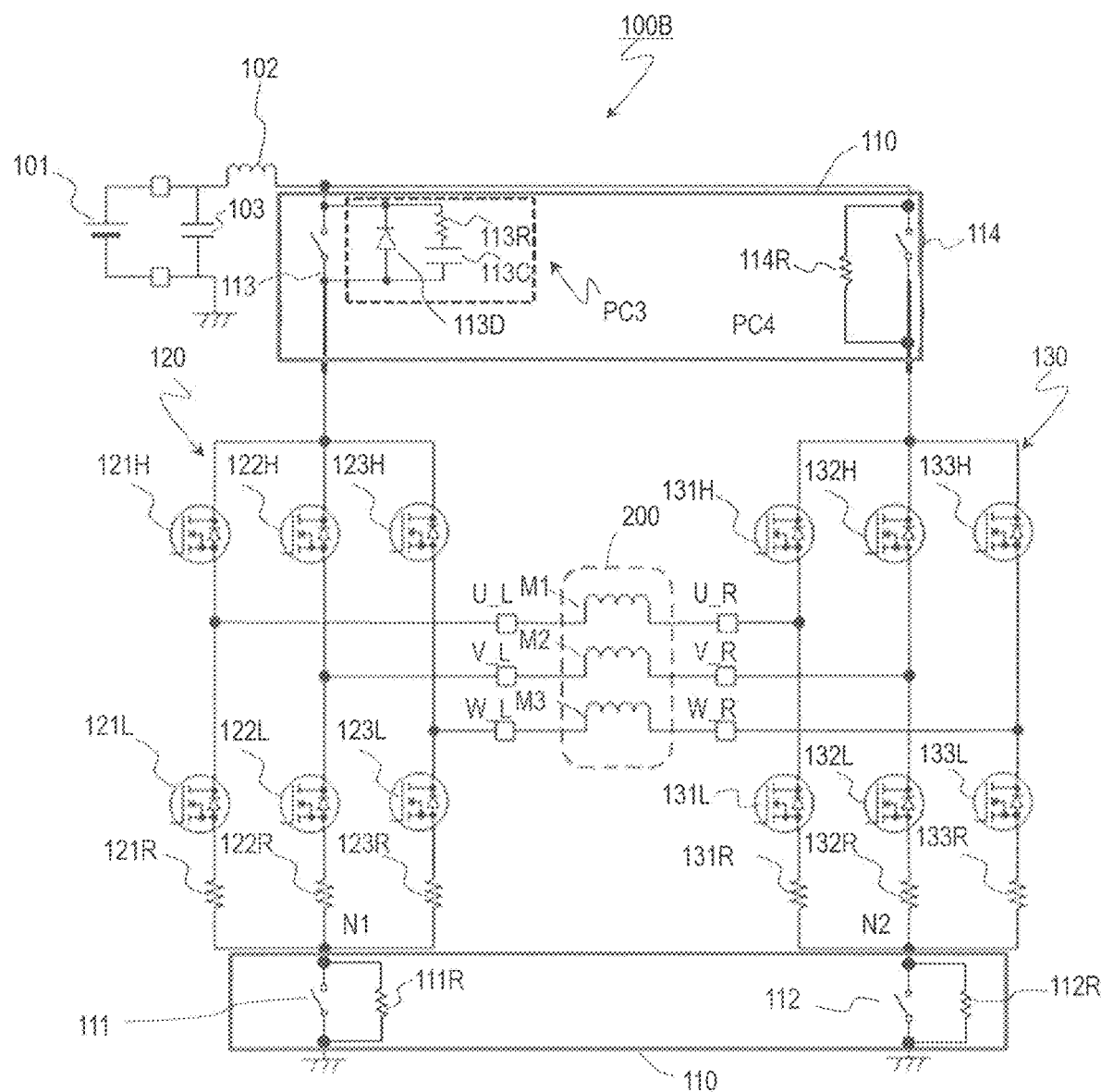
FIG. 18B is a circuit diagram showing a circuit configuration of a power conversion device 100B according to the illustrative second embodiment that includes a diode and an RC circuit as protection circuits.
Figure 19:
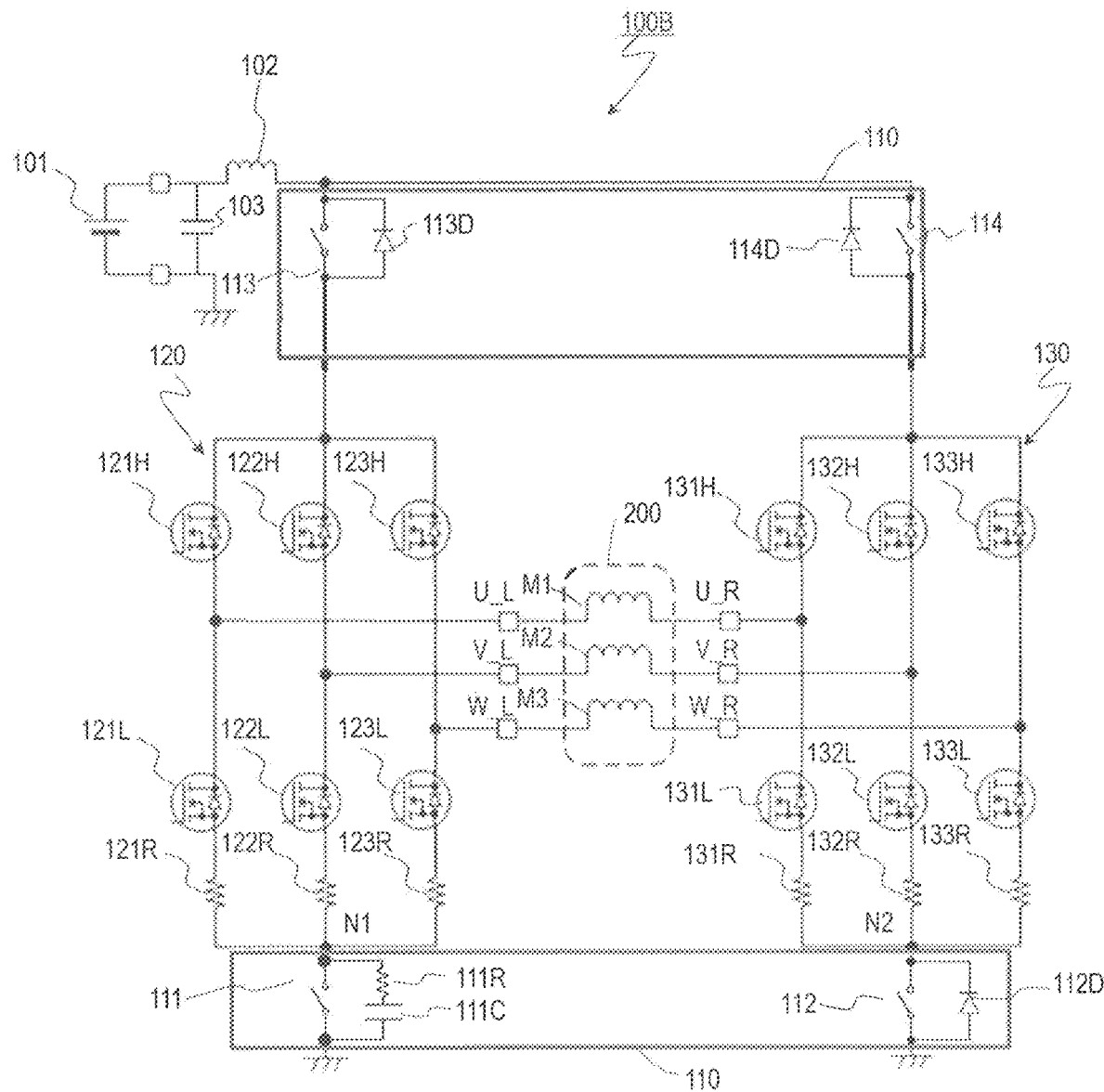
FIG. 19 is a circuit diagram showing a circuit configuration of a power conversion device 100B according to the illustrative second embodiment in which a diode and an RC circuit coexist as protection circuits.

FIGS. 18A, 18B, and 19 schematically show variations of the circuit configuration of the power conversion device 100B.

As shown in FIG. 18A, the protection circuit PC3 can, for example, be implemented by a diode 113D and a resistance element 113R coupled in parallel thereto. As shown in FIG. 18B, the protection circuit PC3 can, for example, be implemented by a diode 113D and an RC circuit coupled in parallel thereto. The protection circuits PC1, PC2, and PC4 may have a configuration similar to that of the protection circuit PC3.

FIG. 19 shows an example circuit configuration in which a diode and an RC circuit coexist as protection circuits. The protection circuits do not necessarily need to be of the same type. As shown in FIG. 19, a diode and an RC circuit may coexist. Alternatively, a resistance element, a diode, and an RC circuit may coexist.

Third Embodiment

A power conversion device 100C according to a third embodiment includes a FET that has a parasitic diode, as a switching element in the two switch circuits 110. Differences between the third embodiment and the first and second embodiments will now be mainly described, and features common to these embodiments will not be described.

Figure 20:
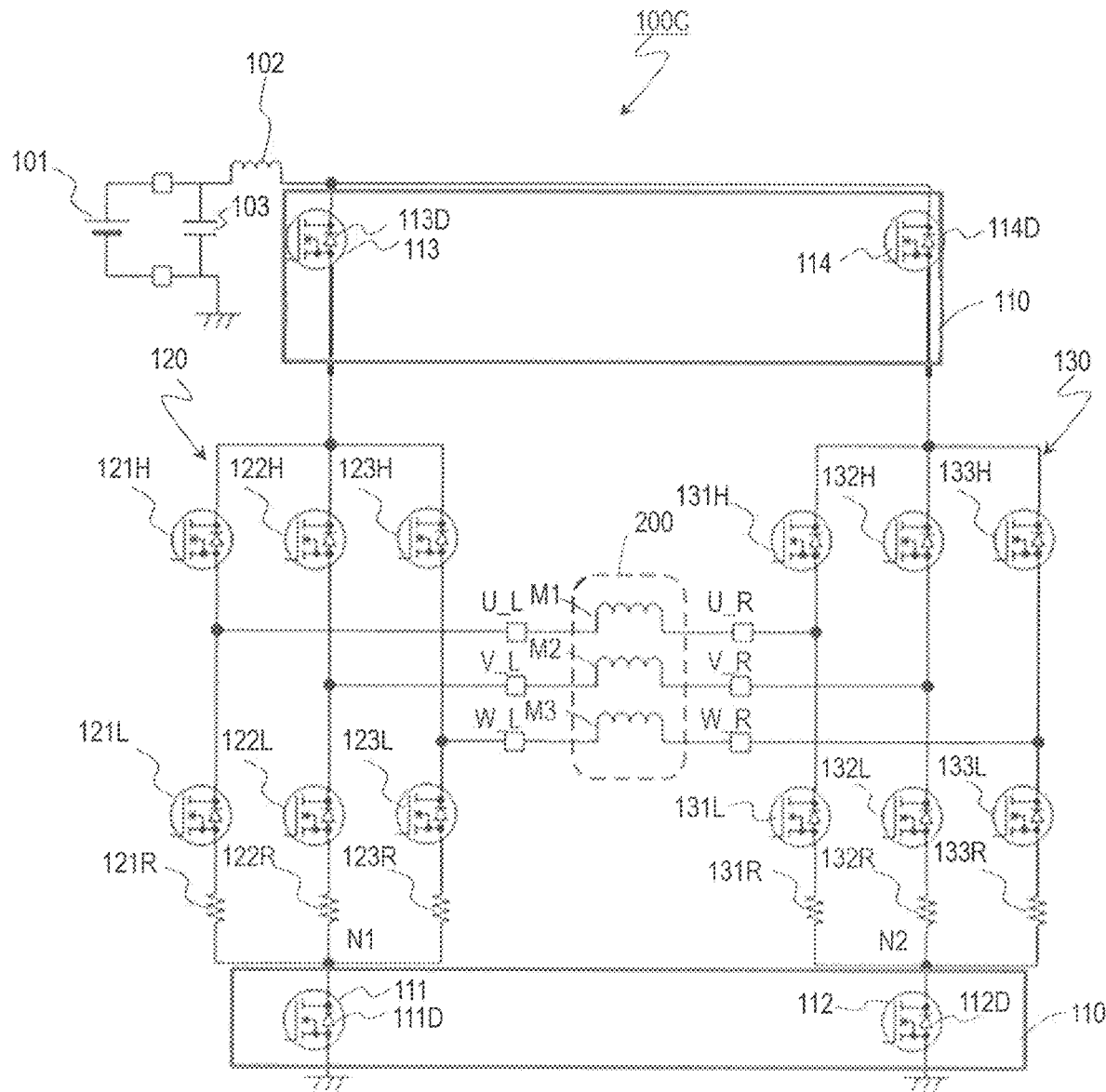
FIG. 20 is a circuit diagram showing a circuit configuration of a power conversion device 100C according to an illustrative third embodiment.

FIG. 20 schematically shows a circuit configuration of a power conversion device 100C of this embodiment.

The power conversion device 100C includes FETs 111, 112, 113, and 114 as switch elements 111, 112, 113, and 114. The FETs are typically a MOSFET. It is herein assumed that a protection circuit coupled in parallel to a switching element includes a freewheeling diode of the FET.

The FETs 113 and 114 in the power supply-side switch circuit 110 are disposed such that a forward current flows through parasitic diodes 113D and 114D, respectively, in a direction toward the power supply 101. The FETs 111 and 112 in the GND-side switch circuit 110 are disposed such that a forward current flows through parasitic diodes 111D and 112D, respectively, in a direction toward an inverter.

For example, in the event of a failure in the first inverter 120, a zero-phase current flows through the parasitic diode 111D of the FET 111 or the parasitic diode 113D of the FET 113. Thus, if an FET is used as a switching element, the parasitic diode can function as a protection circuit.

Figure 21:
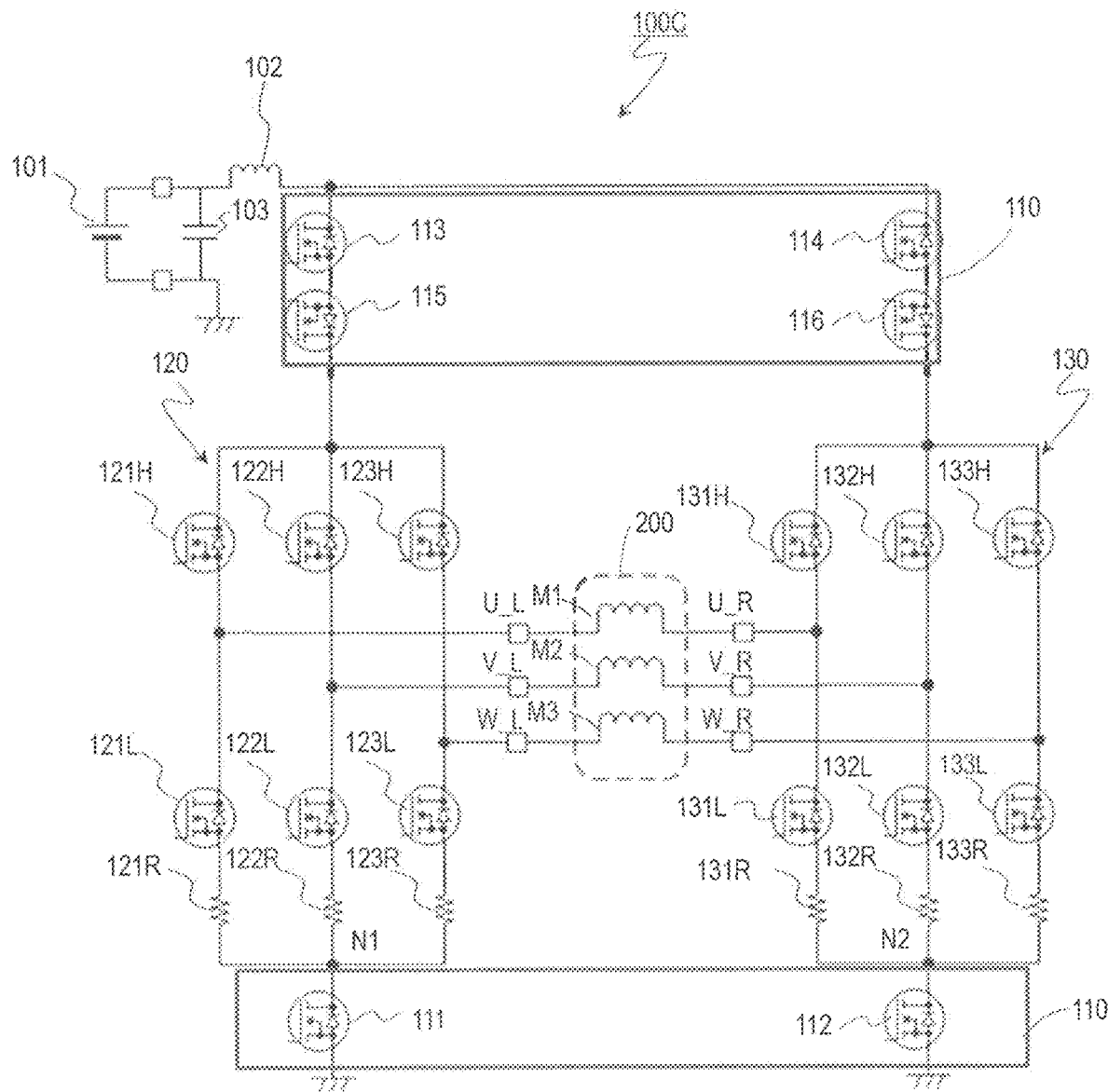
FIG. 21 is a circuit diagram showing a circuit configuration of a power conversion device 100C according to the illustrative third embodiment that further includes two FETs for reverse connection protection.

FIG. 21 schematically shows a circuit configuration of a power conversion device 100C that further includes two FETs for reverse connection protection.

As described in the first embodiment, the power conversion device 100C can include two FETs 115 and 116 for reverse connection protection. The FETs 113 and 115 are disposed such that the directions of the parasitic diodes thereof are opposite to each other. The FETs 114 and 116 are disposed such that the directions of the parasitic diodes thereof are opposite to each other. The FETs 115 and 116 are always on, and therefore, a zero-phase current can flow through the parasitic diode 113D or 114D.

Figure 22:
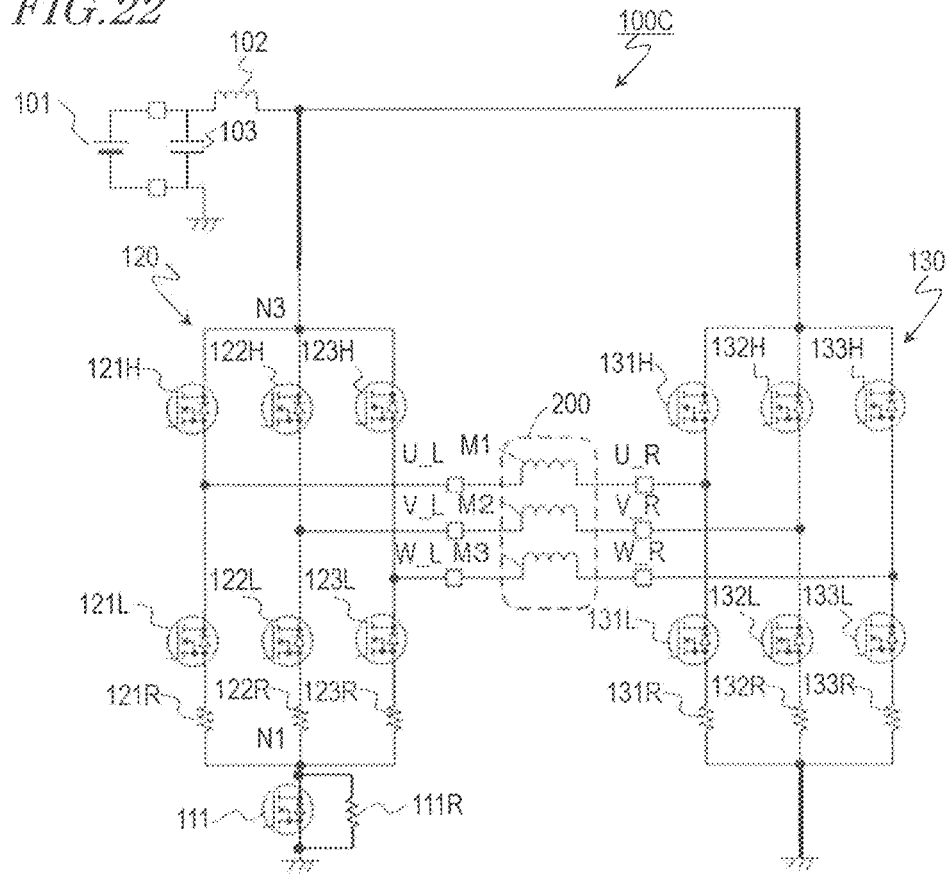
FIG. 22 is a circuit diagram showing another circuit configuration of the power conversion device 100C of the illustrative third embodiment.

FIG. 22 schematically shows another circuit configuration of the power conversion device 100C of this embodiment.

As shown in FIG. 22, a resistance element 111R can be coupled in parallel to the FET 111, for example. For example, it is assumed that an open-circuit failure has occurred in all the FETs 121H, 122H, and 123H of the first inverter 120. In this case, a zero-phase current cannot flow through the parasitic diode of the FET 111, and can flow through the resistance element 111R. In other words, a zero-phase current can be caused to flow out.

In the power conversion device of the present disclosure, a switching element coupled to a protection circuit, and a FET having a parasitic diode, may coexist.

Fourth Embodiment

Vehicles such as automobiles are typically equipped with an electric power steering device. The electric power steering device generates an assistive torque that is added to the steering torque of a steering system that is generated by a driver turning a steering wheel. The assistive torque is generated by an assistive torque mechanism, and can reduce a driver's burden of turning a steering wheel. For example, the assistive torque mechanism includes a steering torque sensor, an ECU, a motor, and a deceleration mechanism. The steering torque sensor detects a steering torque in the steering system. The ECU generates a drive signal on the basis of a detection signal from the steering torque sensor. The motor generates an assistive torque depending on the steering torque on the basis of the motor drive signal. The assistive torque is transferred through the deceleration mechanism to the steering system.

The motor drive unit 400 of the present disclosure may be used in the electric power steering device.

Figure 23:
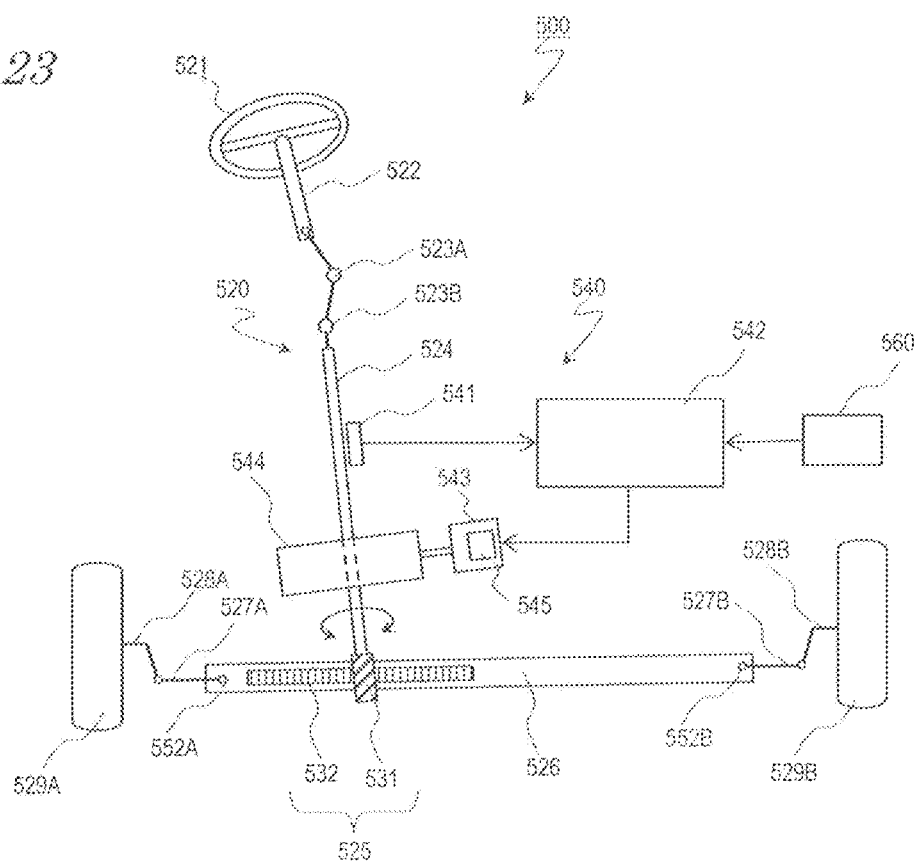
FIG. 23 is a schematic diagram showing a typical configuration of an electric power steering device 500 according to the illustrative third embodiment.

FIG. 23 schematically shows a typical configuration of an electric power steering device 500 according to this embodiment. The electric power steering device 500 includes a steering system 520 and an assistive torque mechanism 540.

The steering system 520 includes, for example, a steering wheel 521, a steering shaft 522 (also called a "steering column"), universal couplings 523A and 523B, a rotating shaft 524 (also called a "pinion shaft" or "input shaft"), a rack and pinion mechanism 525, a rack shaft 526, left and right ball joints 552A and 552B, tie rods 527A and 527B, knuckles 528A and 528B, and left and right steerable wheels (e.g., left and right front wheels) 529A and 529B. The steering wheel 521 is linked through the steering shaft 522 and the universal couplings 523A and 523B to the rotating shaft 524. The rotating shaft 524 is linked through the rack and pinion mechanism 525 to the rack shaft 526. The rack and pinion mechanism 525 has a pinion 531 provided on the rotating shaft 524, and a rack 532 provided on the rack shaft 526. A right end of the rack shaft 526 is linked to the right steerable wheel 529A through the ball joint 552A, the tie rod 527A, and the knuckle 528A in this order with the ball joint 552A being closest to the right end of the rack shaft 526. As with the right side, a left end of the rack shaft 526 is linked to the left steerable wheel 529B through the ball joint 552B, the tie rod 527B, and the knuckle 528B in this order with the ball joint 552B being closest to the left end of the rack shaft 526. Here, the right and left sides correspond to the right and left sides, respectively, of a driver sitting on a seat.

In the steering system 520, a steering torque is generated by a driver turning the steering wheel 521, and is transmitted through the rack and pinion mechanism 525 to the left and right steerable wheels 529A and 529B. As a result, the driver can control the left and right steerable wheels 529A and 529B.

The assistive torque mechanism 540 includes, for example, a steering torque sensor 541, an ECU 542, a motor 543, a deceleration mechanism 544, and a power conversion device 545. The assistive torque mechanism 540 applies an assistive torque to the steering system 520 including from the steering wheel 521 to the left and right steerable wheels 529A and 529B. Note that the assistive torque may also be called an "additional torque."

As the ECU 542, the control circuit 300 of this embodiment can be used. As the power conversion device 545, the power conversion device 100 of this embodiment can be used. The motor 543 is equivalent to the motor 200 of this embodiment. As a mechanically and electronically integrated motor including the ECU 542, the motor 543, and the power conversion device 545, the motor drive unit 400 of this embodiment may be used.

The steering torque sensor 541 detects a steering torque that is applied to the steering system 520 using the steering wheel 521. The ECU 542 generates a drive signal for driving the motor 543 on the basis of a detection signal (hereinafter referred to as a "torque signal") from the steering torque sensor 541. The motor 543 generates an assistive torque depending on the steering torque on the basis of the drive signal. The assistive torque is transmitted through the deceleration mechanism 544 to the rotating shaft 524 of the steering system 520. The deceleration mechanism 544 is, for example, a worm gear mechanism. The assistive torque is further transmitted from the rotating shaft 524 to the rack and pinion mechanism 525.

The electric power steering device 500 may be categorized into the pinion assist type, rack assist type, column assist type, etc., according to a portion of the steering system 520 to which the assistive torque is added. FIG. 23 illustrates the electric power steering device 500 of the pinion assist type. Note that the electric power steering device 500 may be of the rack assist type, column assist type, etc.

In addition to the torque signal, a vehicle speed signal may be input to the ECU 542, for example. A piece of external equipment 560 may, for example, be a vehicle speed sensor. Alternatively, the external equipment 560 may, for example, be another ECU that can communicate with the ECU 542 over an in-vehicle network, such as a controller area network (CAN). The microcontroller of the ECU 542 can perform vector control or PWM control on the motor 543 on the basis of the torque signal and the vehicle speed signal, etc.

The ECU 542 determines a desired current value on the basis of at least the torque signal. The ECU 542 may determine the desired current value, taking into account the vehicle speed signal detected by the vehicle speed sensor, and in addition, a rotor rotation signal detected by an angle sensor. The ECU 542 can control a drive signal, i.e. a drive current, for the motor 543 such that an actual current value detected by a current sensor (not shown) is equal to the desired current value.

The electric power steering device 500 can control the left and right steerable wheels 529A and 529B through the rack shaft 526 using a composite torque obtained by adding the assistive torque of the motor 543 to a driver's steering torque. In particular, if the motor drive unit 400 of the present disclosure is applied to the above mechanically and electronically integrated motor, an electric power steering device including a motor drive unit is provided in which the quality of parts can be improved, and suitable current control can be performed under both normal and abnormal conditions.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A power conversion device for converting power from a single power supply into power that is to be supplied to a motor having n phase windings n being an integer of three or more, and the device comprising:
   a first inverter to which a first end of each phase winding of the motor is coupled and which has low-side switching elements and high-side switing elements;
   a second inverter to which a second end of each phase winding is coupled and which has low-side switching elements and high-side switing elements;
   a ground-side switch circuit structured to electrically connect the first inverter to a ground, and to electrically connect the second inverter to the ground; and
   a power supply-side switch circuit structured to electrically connect the first inverter to the power supply and to electrically connect the second inverter to the power supply;
   wherein the ground-side switch circuit has:
      a first switch element structured to switch between connection and disconnection of a low-side node of the first inverter to and from the ground, and a first protection circuit being coupled in parallel to the first switch element, and
      a second switch element structured to switch between connection and disconnection of a low-side node of the second inverter to and from the ground, and a second protection circuit being coupled in parallel to the second switch element;
   the power supply-side switch circuit has:
      a third switch element structured to switch between connection and disconnection of a high-side node of the first inverter to and from the power supply, and a third protection circuit being coupled in parallel to the third switch element, and
      a fourth switch element structured to switch between connection and disconnection of a high-side node of the second inverter to and from the power supply, and a fourth protection circuit being coupled in parallel to the fourth switch element;
   the first protection circuit is electrically connected to the low-side node of the first inverter and to the ground;
   the second protection circuit is electrically connected to the low-side node of the second inverter and to the ground;
   the third protection circuit is electrically connected to the hgih-side node of the first inverter and to the power supply; and
   the fourth protection circuit is electrically connected to the hgih-side node of the second inverter and to the power supply.

2. The power conversion device of claim 1, wherein the first protection circuit and the second protection circuit each comprise a diode.

3. The power conversion device of claim 1, wherein the first protection circuit and the second protection circuit each comprise an RC circuit.

4. The power conversion device of claim 1, wherein the first protection circuit and the second protection circuit each comprise a single resistance element, or a plurality of resistance elements coupled together in series or in parallel.

5. The power conversion device of claim 1, wherein at least one of the first protection circuit, the second protection circuit, the third protection circuit, and the fourth protection circuit comprises a diode.

6. The power conversion device of claim 1, wherein at least one of the first protection circuit, the second protection circuit, the third protection circuit, and the fourth protection circuit comprises an RC circuit.

7. The power conversion device of claim 1, wherein
at least one of the first protection circuit, the second protection circuit, the third protection circuit, and the fourth protection circuit comprises a single resistance element, or a plurality of resistance elements coupled together in series or in parallel.

8. The power conversion device of claim 5, wherein
the first protection circuit, the second protection circuit, the third protection circuit, and the fourth protection circuit each comprise a diode.

9. The power conversion device of claim 6, wherein
the first protection circuit, the second protection circuit, the third protection circuit, and the fourth protection circuit each comprise an RC circuit.

10. The power conversion device of claim 7, wherein
the first protection circuit, the second protection circuit, the third protection circuit, and the fourth protection circuit each comprise a single resistance element, or a plurality of resistance elements coupled together in series or in parallel.

11. The power conversion device of claim 1, wherein
the power conversion device is structured such that, when the first inverter is not operating normally, the third switch element disconnects the first inverter from the power supply.

12. The power conversion device of claim 1, wherein
the power conversion device is structured such that, when the first inverter is not operating normally, the first switch element disconnects the first inverter from the ground.

13. The power conversion device of claim 11, wherein
the power conversion device is structured such that, when the first inverter is not operating normally, a neutral point for the n phase windings is formed in the first inverter.

14. A motor drive unit comprising:
a motor;
a power conversion device for converting power from a single power supply into power that is to be supplied to the motor having n phase windings n being an integer of three or more, and the device comprising:
  a first inverter to which a first end of each phase winding of the motor is coupled and which has low-side switching elements and high-side switing elements;
  a second inverter to which a second end of each phase winding is coupled and which has low-side switching elements and high-side switing elements; and
  a switch circuit comprising at least one of a first switch element structured to switch between connection and disconnection of a low-side node of the first inverter to and from a ground, a first protection circuit being coupled in parallel to the first switch element, and a second switch element structured to switch between connection and disconnection of a low-side node of the second inverter to and from the ground, a second protection circuit being coupled in parallel to the second switch element; and
a control circuit structured to control the power conversion device,
wherein the control circuit monitors whether or not a zero-phase current is less than a predetermined value, and at least one of the first switch element and the second switch element is turned off by the control circuit when the zero-phase current is less than the predetermined value.

15. An electric power steering device comprising:
a motor drive unit comprising:
a motor;
a power conversion device for converting power from a single power supply into power that is to be supplied to the motor having n phase windings n being an integer of three or more, and the device comprising:
  a first inverter to which a first end of each phase winding of the motor is coupled and which has low-side switching elements and high-side switing elements;
  a second inverter to which a second end of each phase winding is coupled and which has low-side switching elements and high-side switing elements; and
  a switch circuit comprising at least one of a first switch element structured to switch between connection and disconnection of a low-side node of the first inverter to and from a ground, a first protection circuit being coupled in parallel to the first switch element, and a second switch element structured to switch between connection and disconnection of a low-side node of the second inverter to and from the ground, a second protection circuit being coupled in parallel to the second switch element; and
a control circuit structured to control the power conversion device,
wherein the control circuit monitors whether or not a zero-phase current is less than a predetermined value, and at least one of the first switch element and the second switch element is turned off by the control circuit when the zero-phase current is less than the predetermined value.

16. The power conversion device of claim 1, wherein the first inverter and the second inverter selectively receive the power only from the single power supply.

* * * * *